(12) United States Patent
Gartner

(10) Patent No.: US 8,142,154 B2
(45) Date of Patent: Mar. 27, 2012

(54) OSCILLATING ENERGY CAPTURE MECHANISM

(76) Inventor: Matthew Gartner, Strathmore (CA)

( * ) Notice: Subject to any disclaimer, the term of this patent is extended or adjusted under 35 U.S.C. 154(b) by 1125 days.

(21) Appl. No.: 11/984,850

(22) Filed: Nov. 23, 2007

(65) Prior Publication Data
US 2010/0102565 A1    Apr. 29, 2010

Related U.S. Application Data

(60) Provisional application No. 60/860,455, filed on Nov. 22, 2006.

(51) Int. Cl.
*F03D 5/06* (2006.01)

(52) U.S. Cl. ........................ 416/81; 416/132 A

(58) Field of Classification Search ............ 416/132 A, 416/132 B, 79, 81, 82, 83
See application file for complete search history.

(56) References Cited

U.S. PATENT DOCUMENTS

| | | | |
|---|---|---|---|
| 2,604,882 A | 7/1952 | Schnacke | |
| 3,831,936 A * | 8/1974 | Watson et al. | 482/27 |
| 4,228,360 A | 10/1980 | Navarro | |
| 4,348,594 A | 9/1982 | Lipfert | |
| 4,476,397 A | 10/1984 | Lawson | |
| 4,486,145 A * | 12/1984 | Eldredge et al. | 416/82 |
| 4,595,336 A | 6/1986 | Gross | |
| 6,153,944 A | 11/2000 | Clark | |
| 6,217,284 B1 | 4/2001 | Lawrence | |
| 6,273,680 B1 | 8/2001 | Arnold | |
| 6,581,562 B2 | 6/2003 | Goebel et al. | |
| 6,652,232 B2 | 11/2003 | Bolduc | |
| 6,726,440 B2 | 4/2004 | Pollard | |
| 6,914,345 B2 | 7/2005 | Webster | |
| 7,045,912 B2 | 5/2006 | Leijon et al. | |
| 7,626,281 B2 * | 12/2009 | Kawai | 290/54 |
| 2007/0297903 A1 * | 12/2007 | Morris | 416/132 A |

FOREIGN PATENT DOCUMENTS

| | | |
|---|---|---|
| DE | 3130002 | 3/1983 |
| DE | 19938192 A1 * | 2/2001 |

* cited by examiner

*Primary Examiner* — Richard Edgar

(57) ABSTRACT

Two or more pivots are mounted vertically or horizontally onto a rotary or stationary support structure or platform, and between these pivots, a flexible sheet of material is suspended. The mechanism operates via oscillation of the pivots that results from the upwind or upstream pivot determining the side of the flexible sheet the low-pressure (lift) area favors. The downwind or downstream pivot captures the energy from the lift generated. The mechanism makes use of adjustable pivot arm lengths and pivot spacing to tension or relax the flexible sheet, enabling control in various wind and water speeds. Alternate embodiments make use of cord attachments instead of rigid pivots, a double pivot that engages two flexible sheets in opposing action, circular/partial hemispherical sheets than enable omni-directional operation from a fixed embodiment, and shallow water body capability.

17 Claims, 36 Drawing Sheets

OSCILLATING ENERGY CAPTURE MECHANISM

CROSS-REFERENCE TO RELATED APPLICATIONS

Figure 1:
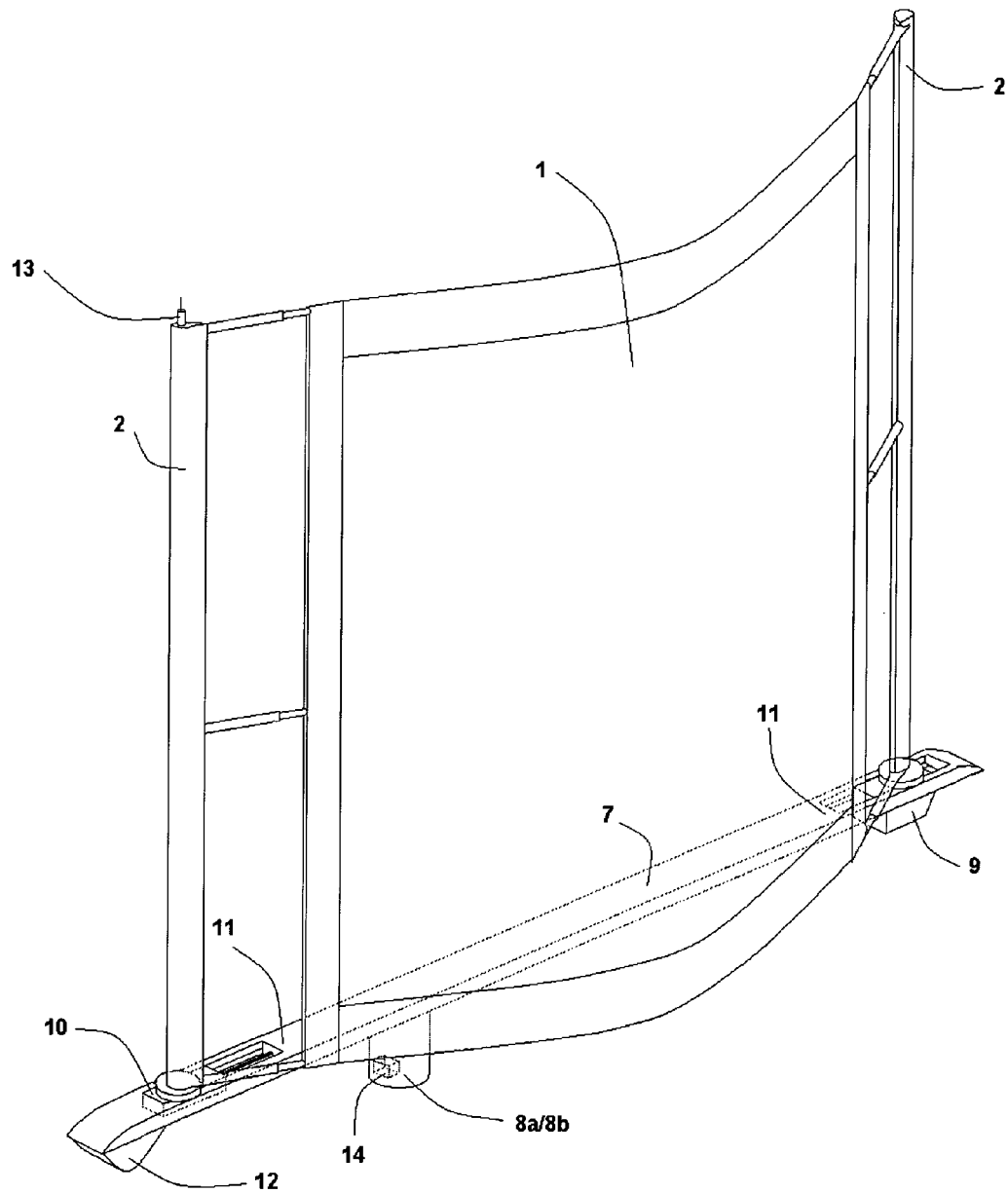

This application claims the benefit of provisional patent application Ser. No. 60/860,455 filed 2006 Nov. 22 by the present inventor.

FEDERALLY SPONSORED RESEARCH

Not applicable

SEQUENCE LISTING OR PROGRAM

Not applicable

BACKGROUND OF THE INVENTION

1. Field of the Invention

This invention relates to the capture of energy from natural sources such as wind and water.

2. Prior Art

U.S. Patent Documents:

| | | |
|---|---|---|
| U.S. Pat. No. 6,914,345 | Jul. 5, 2005 | Webster 290/54. |
| U.S. Pat. No. 4,348,594 | Sep. 7, 1982 | Lipfert 290/54. |
| U.S. Pat. No. 6,153,944 | Nov. 28, 2000 | Clark 290/54. |
| U.S. Pat. No. 4,476,397 | Oct. 9, 1984 | Lawson 290/54. |
| U.S. Pat. No. 6,273,680 | Aug. 14, 2001 | Arnold 416/1 |
| U.S. Pat. No. 6,217,284 | Apr. 17, 2001 | Lawrence 416/83 |
| U.S. Pat. No. 7,045,912 | May 16, 2006 | Leijon et al. 290/42 |
| U.S. Pat. No. 4,228,360 | Oct. 14, 1980 | Navarro 290/43 |
| U.S. Pat. No. 2,604,882 | July 1952 | Schnacke 123/185.4 |
| U.S. Pat. No. 6,581,562 | Jun. 24, 2003 | Goebel, et al. 123/185.3 |
| U.S. Pat. No. 6,726,440 | Mar. 22, 2002 | Pollard 415/41 |
| U.S. Pat. No. 4,595,336 | Jun. 17, 1986 | Gross 416/82 |
| U.S. Pat. No. 6,652,232 | Jan. 3, 2002 | Maxime Lambert Bolduc 416/24 |

Foreign Patent Documents:

| | | |
|---|---|---|
| DE3130002 | Mar. 3, 1983 | Braun F03D5/06; F03D5/00 |

Other References:

Oscillating Wing—Vortex Oscillation Technology, Inc. http://www.vortexosc.com/modules.php?name=Content&pa=showpage&pid=87

The inventions shown in the Prior art above utilize impractical and inefficient means of capturing energy from wind and water.

Several of the inventions, such as U.S. Pat. No. 6,652,232 may function, but their structure is impractical for scaling. This particular example would produce a limited quantity of energy relative to modern standards, and when scaled would be lack the structural integrity and performance to justify its cost.

The examples cited in the URL above relate to oscillating wings. The designs however, work in only one wind direction (The oscillating wing structure), would not retain their intended airfoil shape while curving and buckling (at least not without internal structures that would prevent oscillation entirely. Some are so grandiose as to be structurally impossible to construct (The valley wide idea)

Other inventions such as U.S. Pat. No. 6,726,440, attempt to modify the flapping wing concept that has been rejected long ago as impractical. The U.S. Pat. No. 4,595,336 uses two wings to create a flapping motion as well.

OBJECTS AND ADVANTAGES

The objects of this invention are:
1. To provide a cost-effective means of capturing the energy in a wind or water flow
2. To maximize energy extraction from wind and water currents Other objects and advantages will become apparent from a consideration of the drawings and ensuing description in this application.

This invention makes use of a flexible sheet whose cost and related component cost is reduced in comparison to existing wind and water energy conversion systems. The use of a large surface area also ensures the invention can extract energy from a much greater cross-section of wind or water currents than current wind and water energy conversion systems. The invention also incorporates several key features that drastically reduce the sources of failure, including the ability to vane into the wind without the requirement for mechanical adjustment. It also reduces the cost of maintenance. And finally, depending on the proximity to the ground, the invention can also minimize construction and maintenance costs and reduces the visual impact within the area it is located. The novelty of the surface area this invention can provide may also be used to promote renewable energy and to act as an advertising or public information medium.

SUMMARY

The mechanism is an energy capture device utilizing flexible sheets of material suspended between two or more pivots. The pivots are attached to a platform, either stationary or rotary depending on the medium in which the mechanism to operate.

DRAWINGS—FIGURES

Figures

Figure 2:
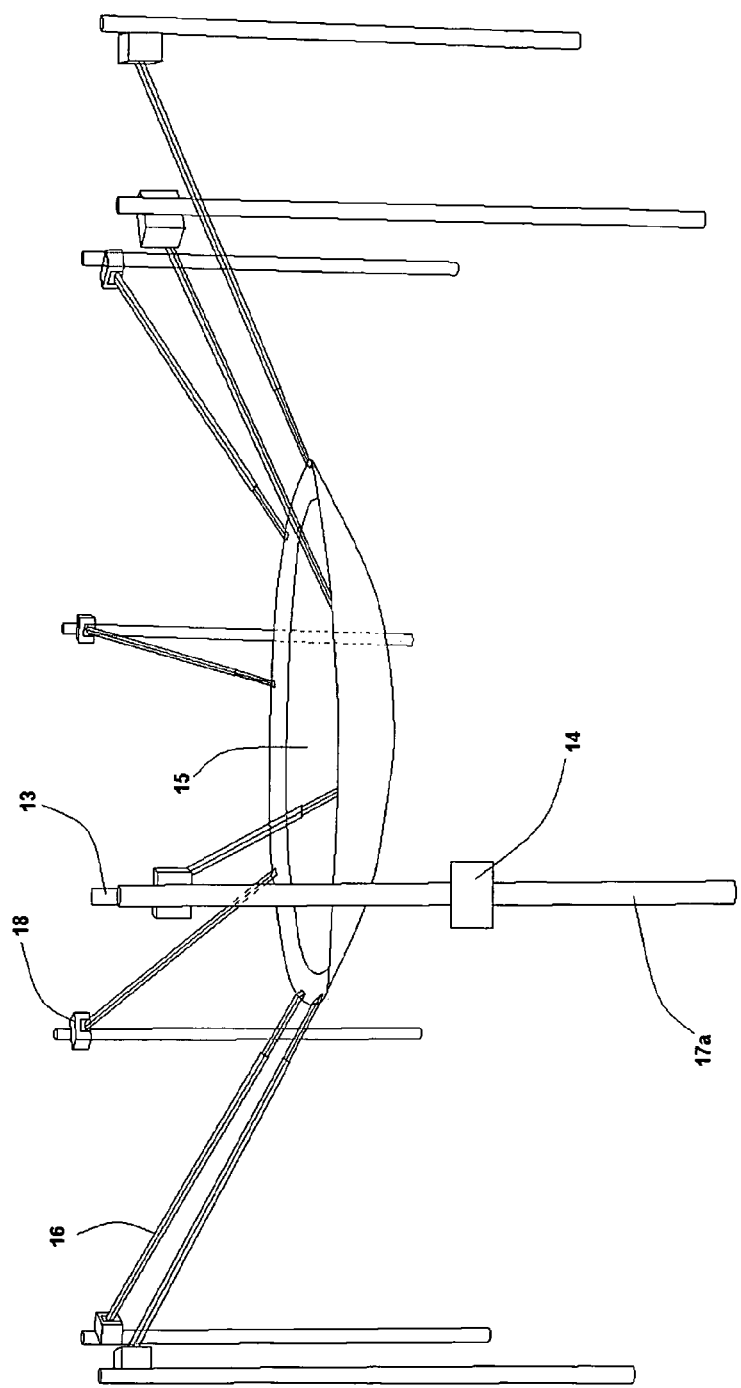
Figure 3:
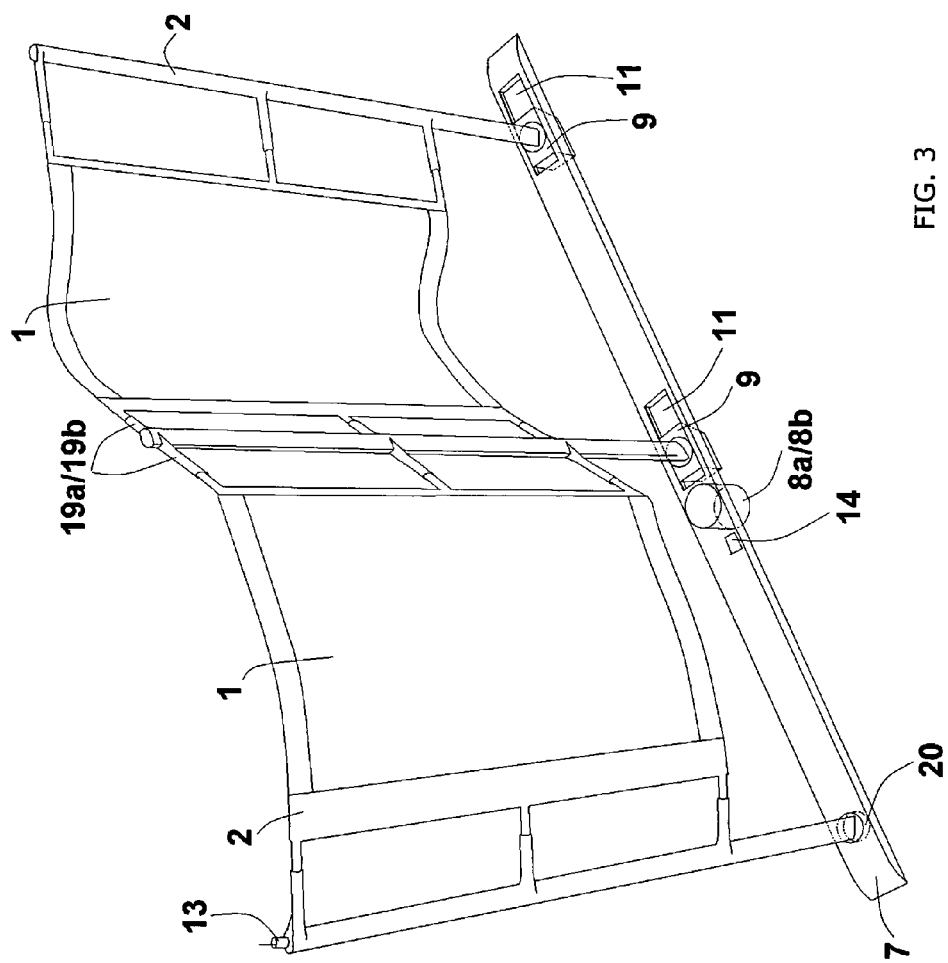
Figure 4:
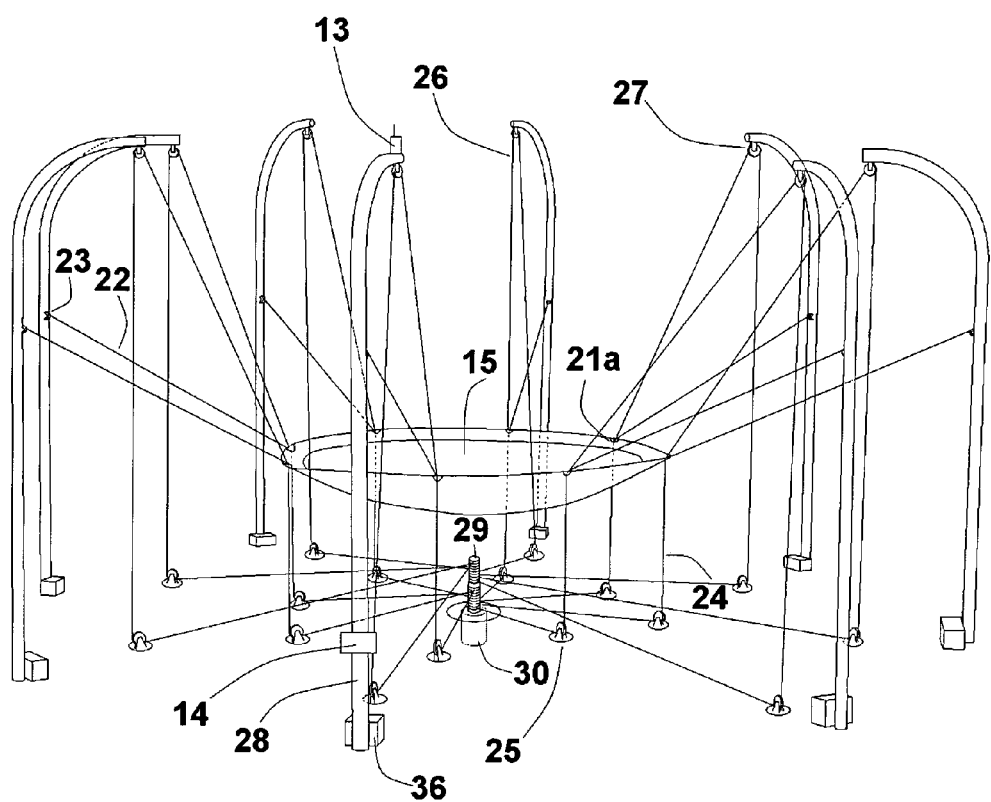
Figure 5:
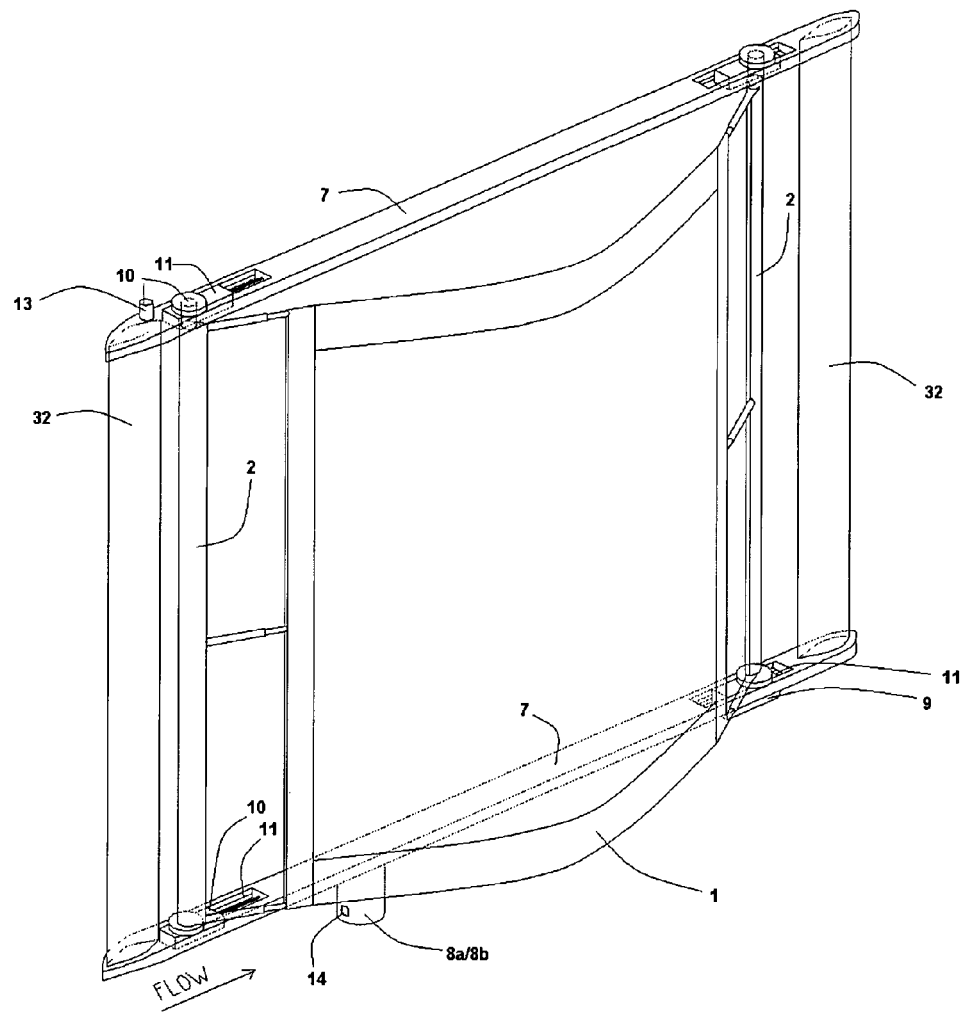
Figure 6:
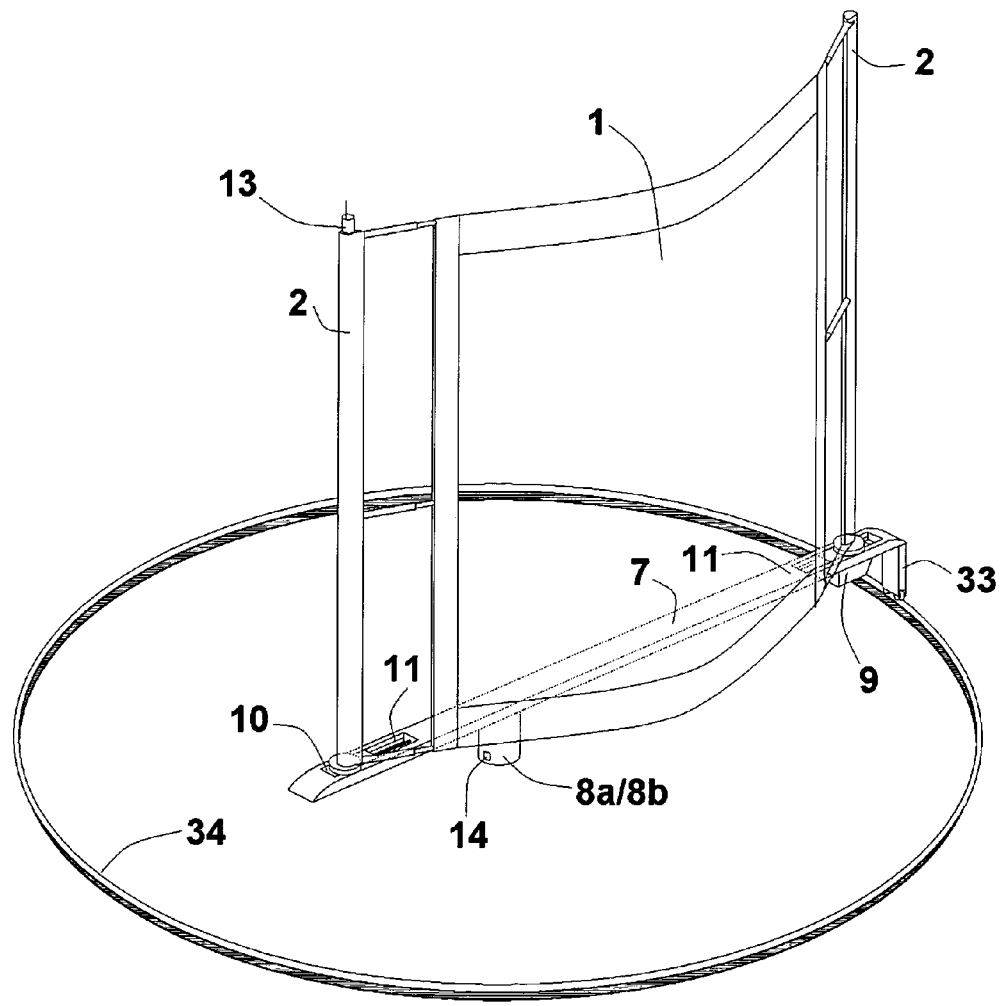
Figure 7:
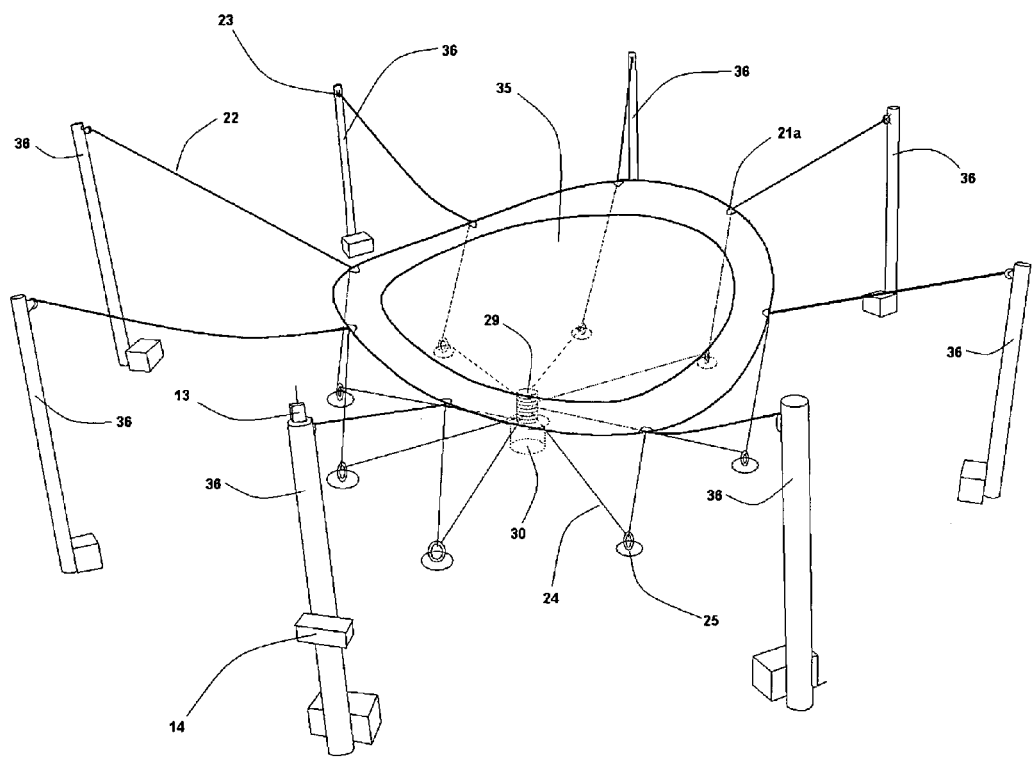
Figure 8:
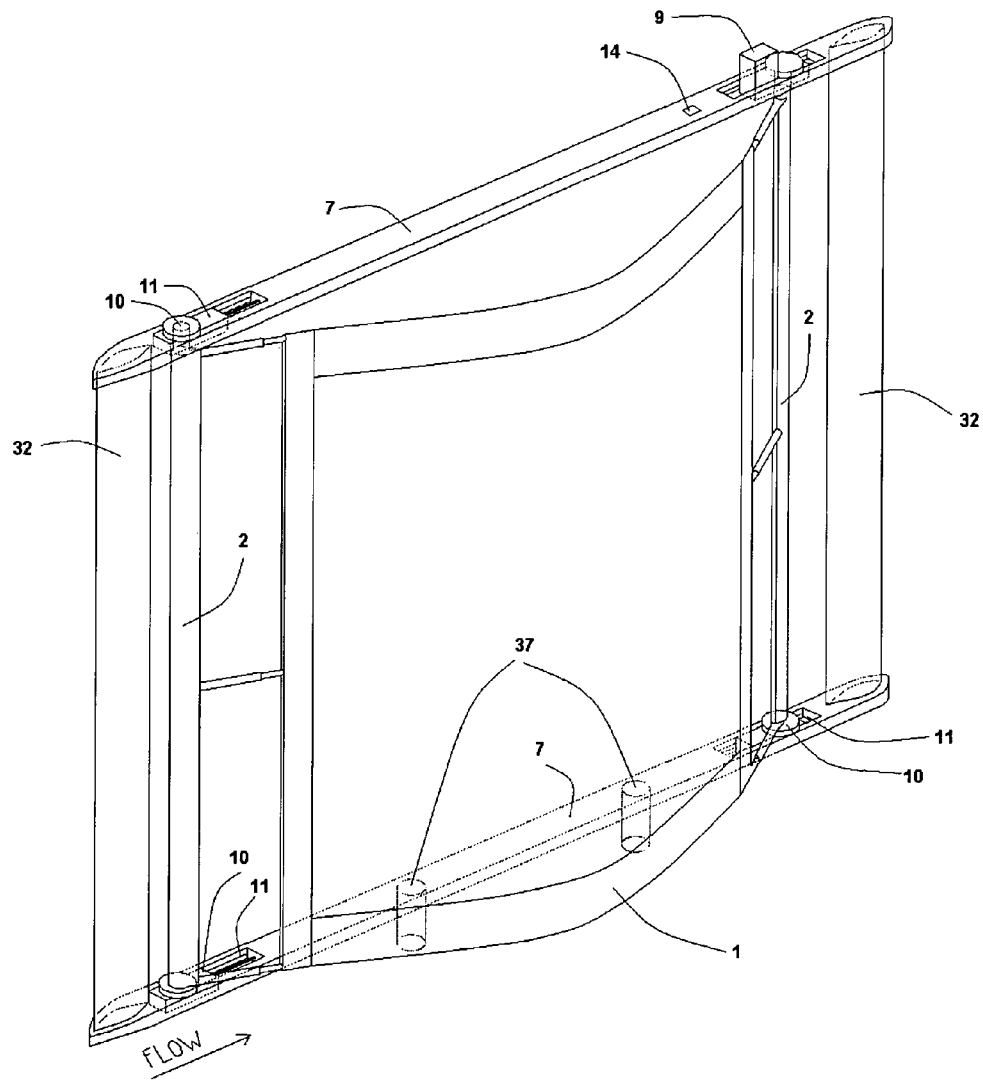
Figure 9:
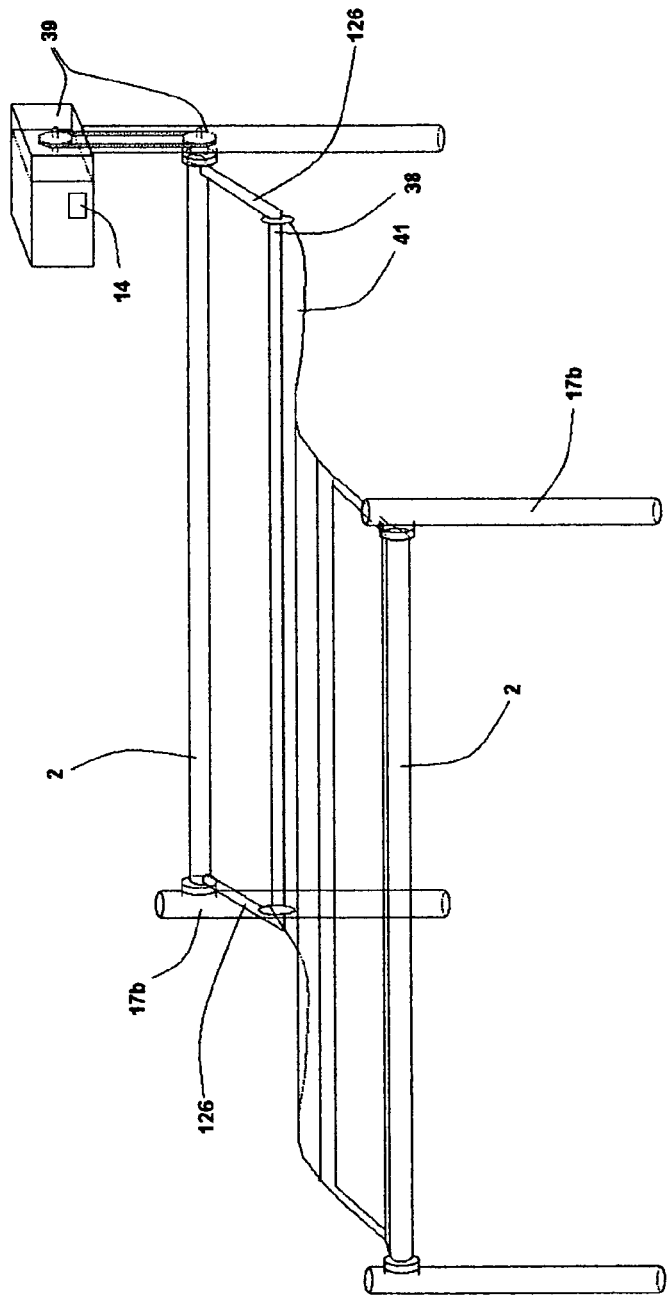

FIG. 1 shows a perspective view of a vertically oriented wind energy capture embodiment with pivot arms/pole assemblies.
FIG. 2 shows a perspective view of a horizontally oriented wind energy capture embodiment with multiple lever arm assemblies.
FIG. 3 shows a perspective view of a vertically oriented wind energy capture embodiment using two flexible sheets supported by three pivot arm/pole assemblies.
FIG. 4 shows a perspective view of a horizontally oriented wind energy capture embodiment using double tethers on a light-pole style support.
FIG. 5 shows a perspective view of a vertically oriented wind energy capture embodiment using an additional top structure support.
FIG. 6 shows a perspective view of a vertically oriented wind energy capture embodiment using a rail track support.
FIG. 7 shows a perspective view of a horizontally oriented wind energy capture embodiment using a saddle shaped flexible sheet and single tethers.
FIG. 8 shows a perspective view of a vertically oriented water flow energy capture embodiment using a base embedded into the bottom of a water body.
FIG. 9 shows a perspective view of a horizontally oriented water flow energy capture embodiment using pivots.

Figures -continued

Figure 10:
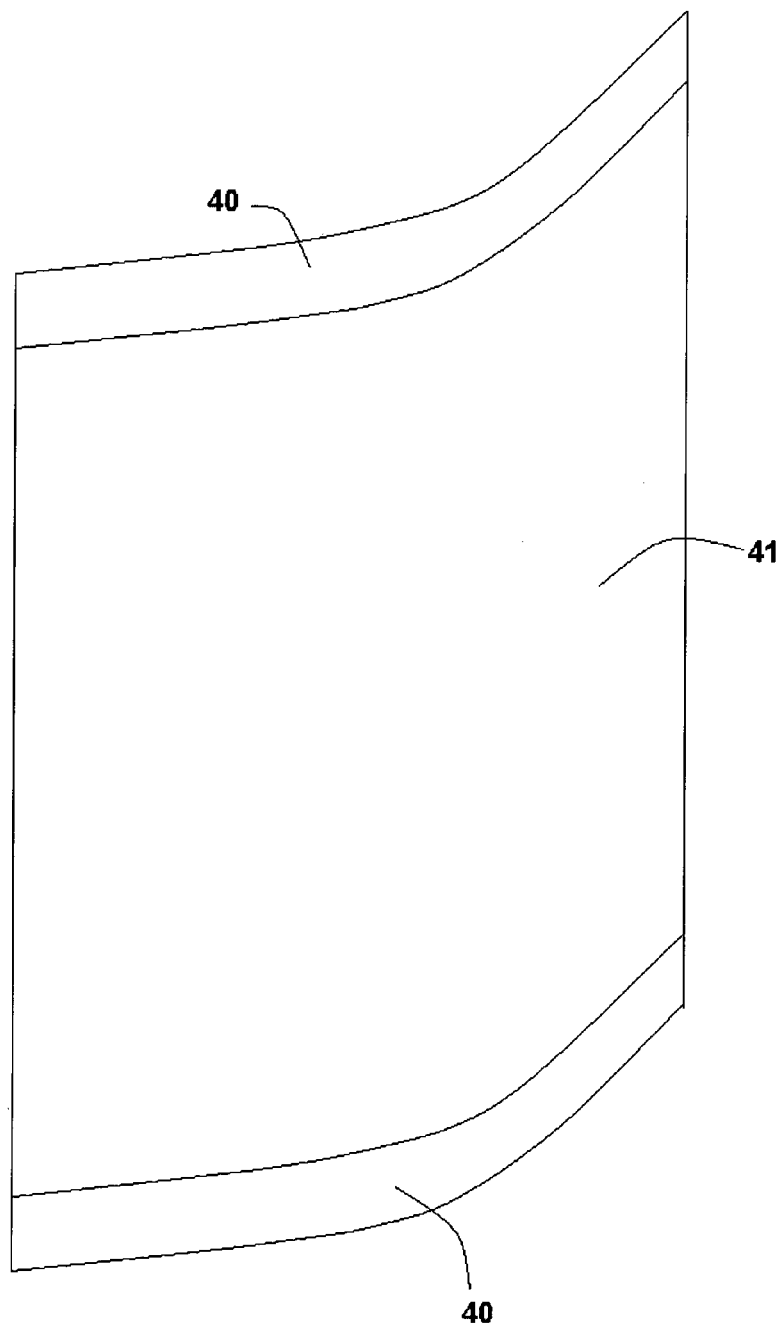
Figure 11:
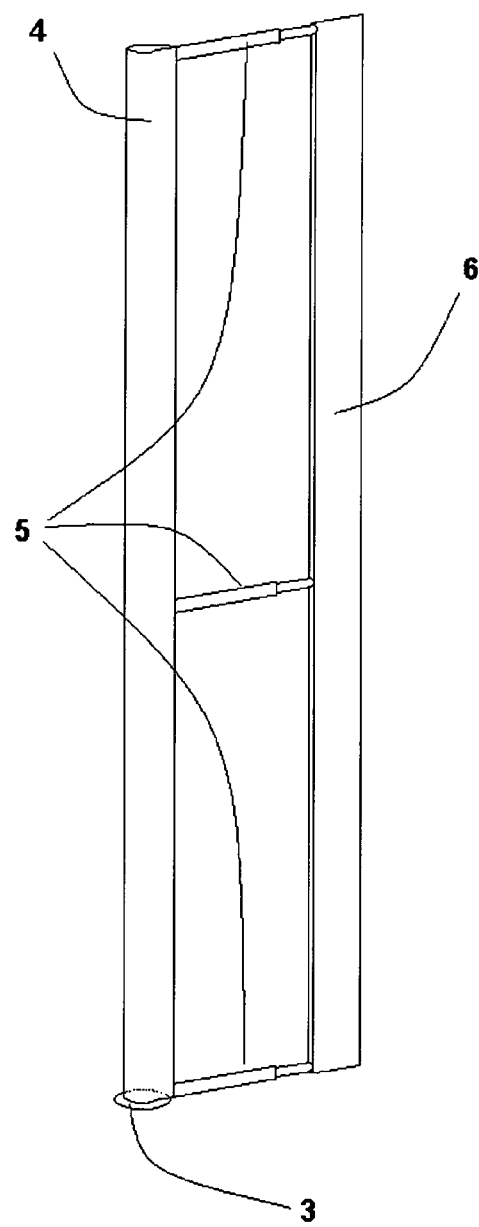
Figure 12:
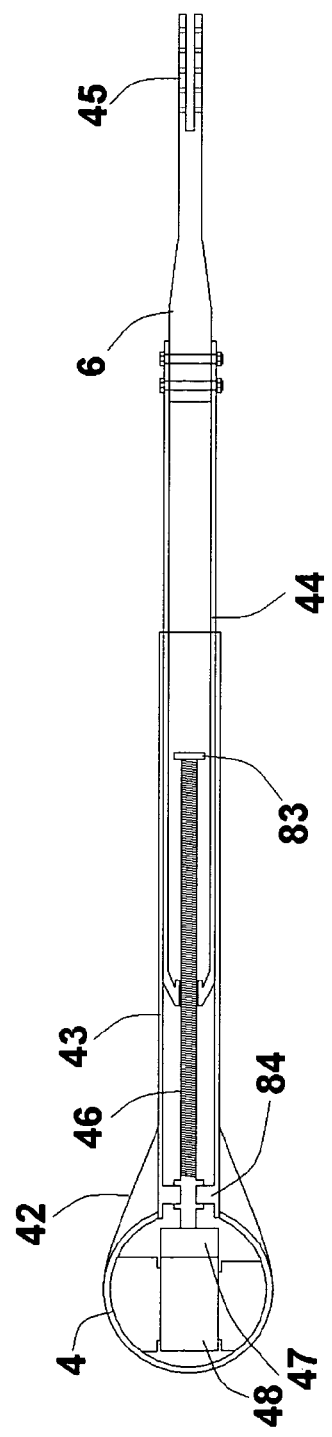
Figure 13:
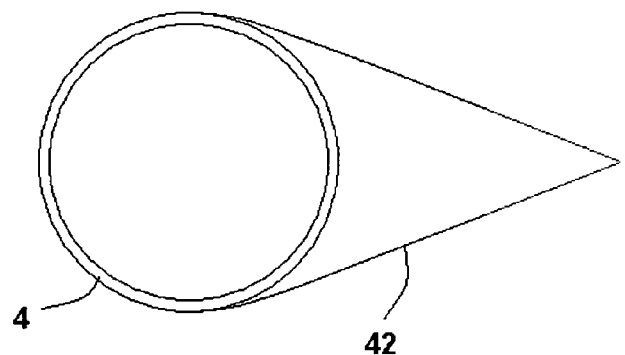
Figure 14:
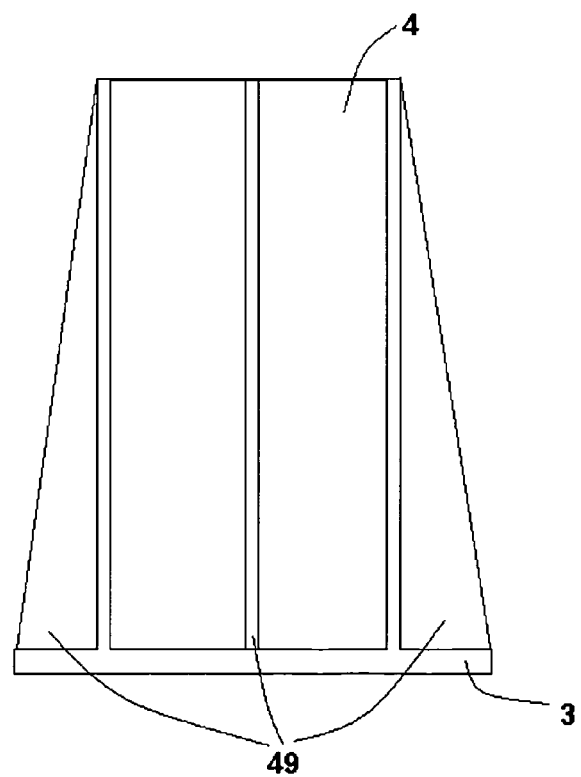
Figure 15:
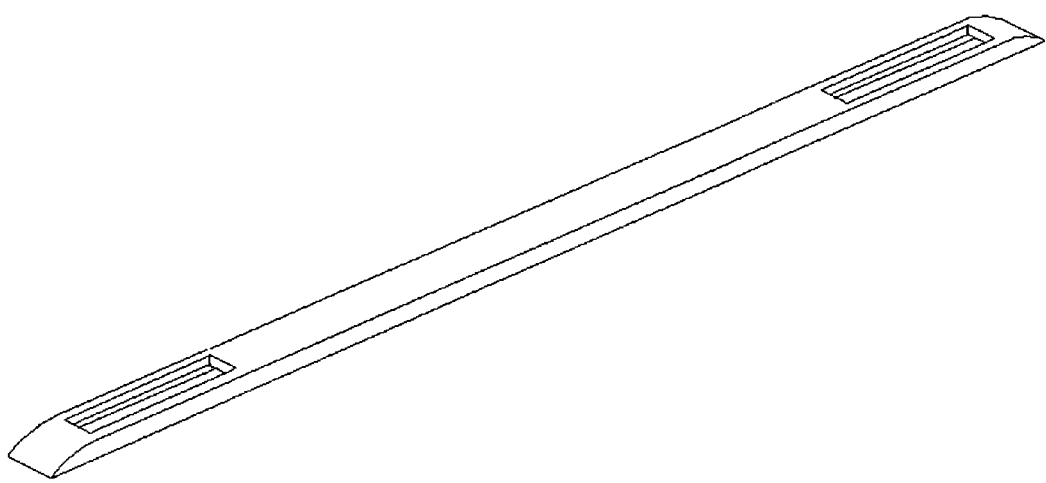
Figure 16:
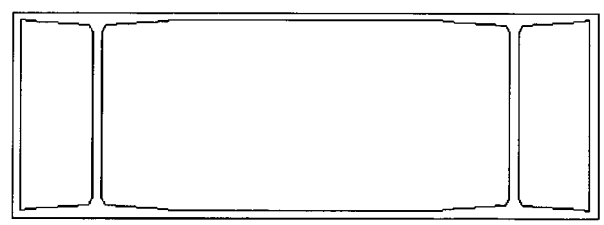
Figure 17:
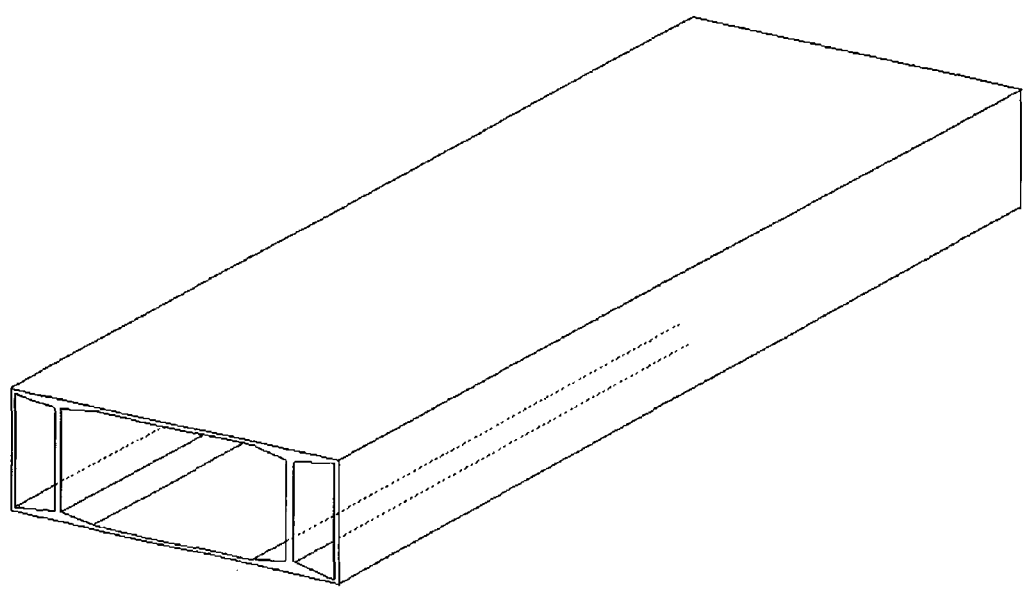
Figure 18:
Figure 19:
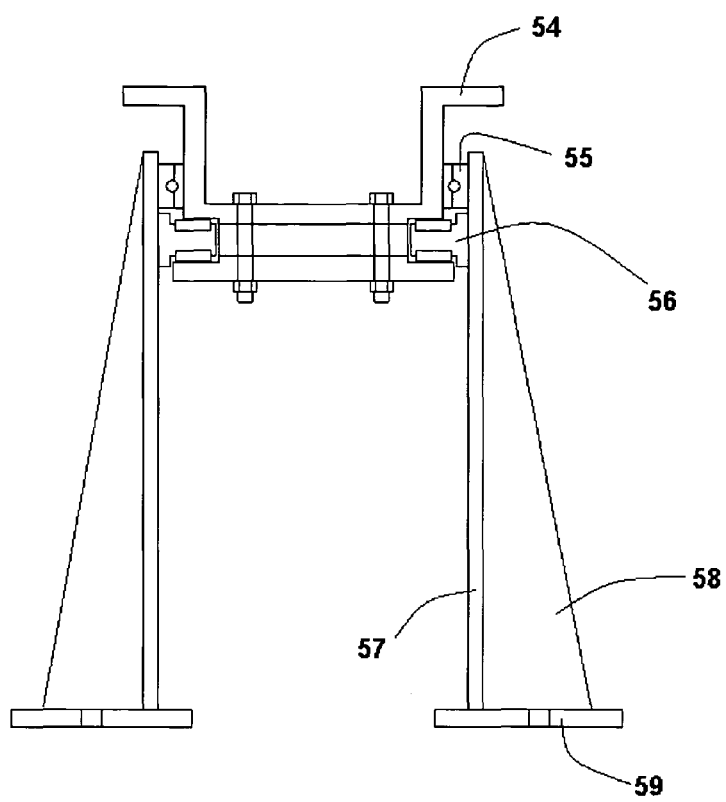
Figure 20:
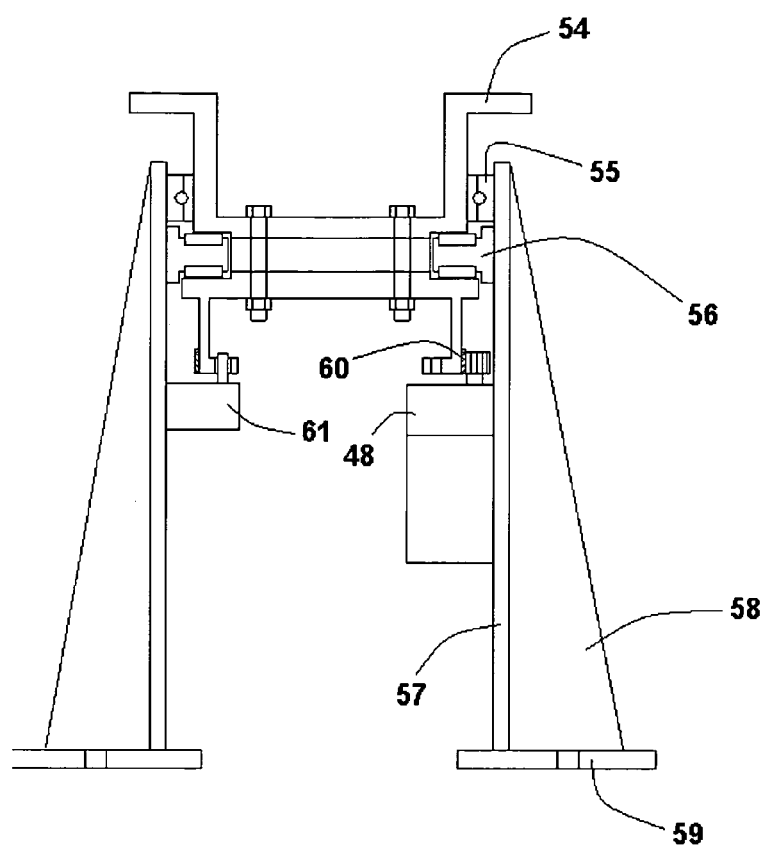
Figure 21:
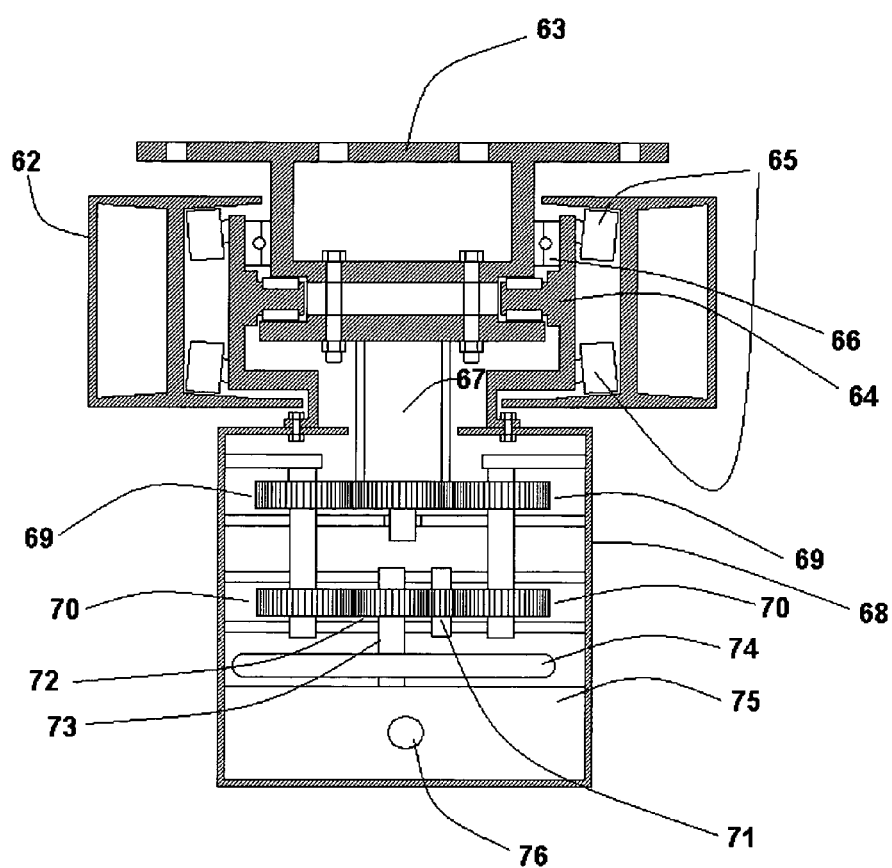
Figure 22:
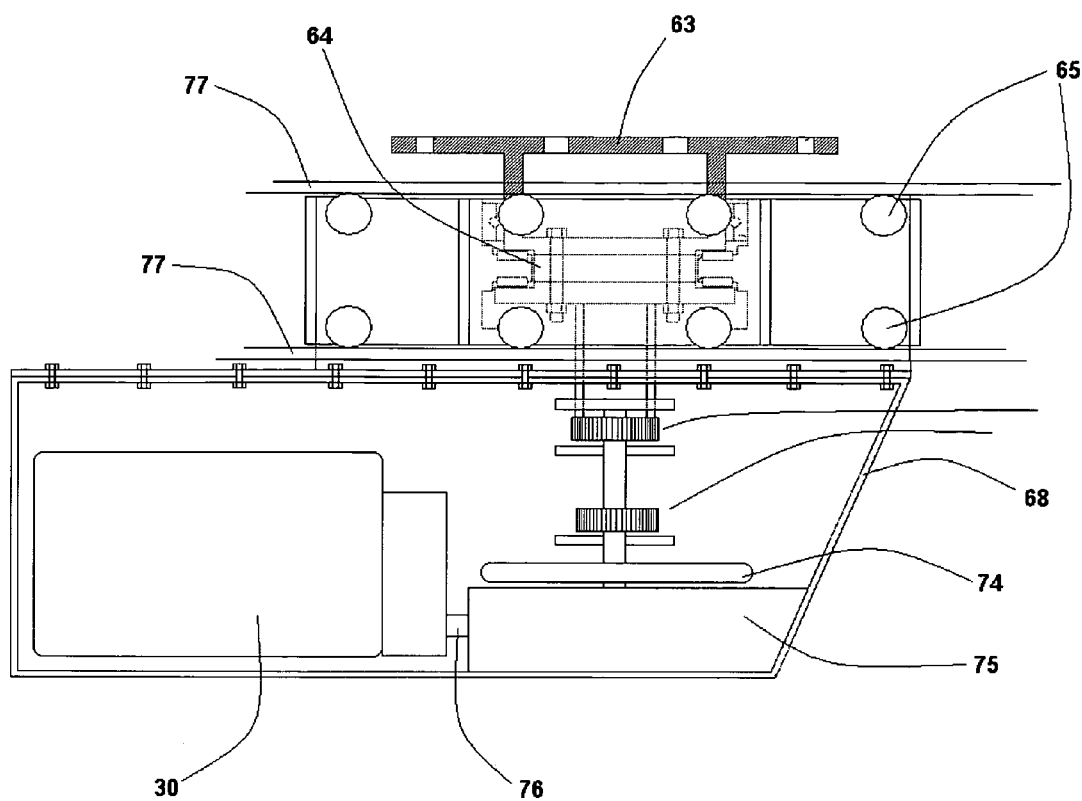
Figure 23:
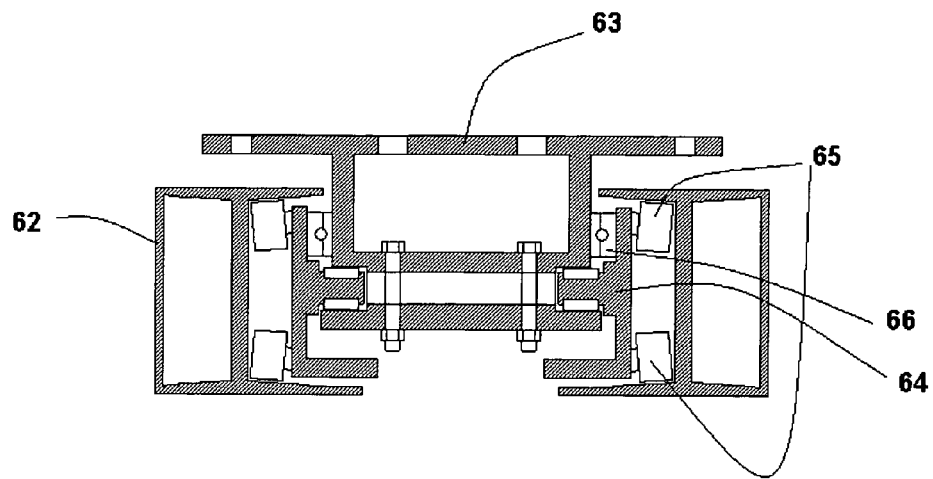
Figure 24:
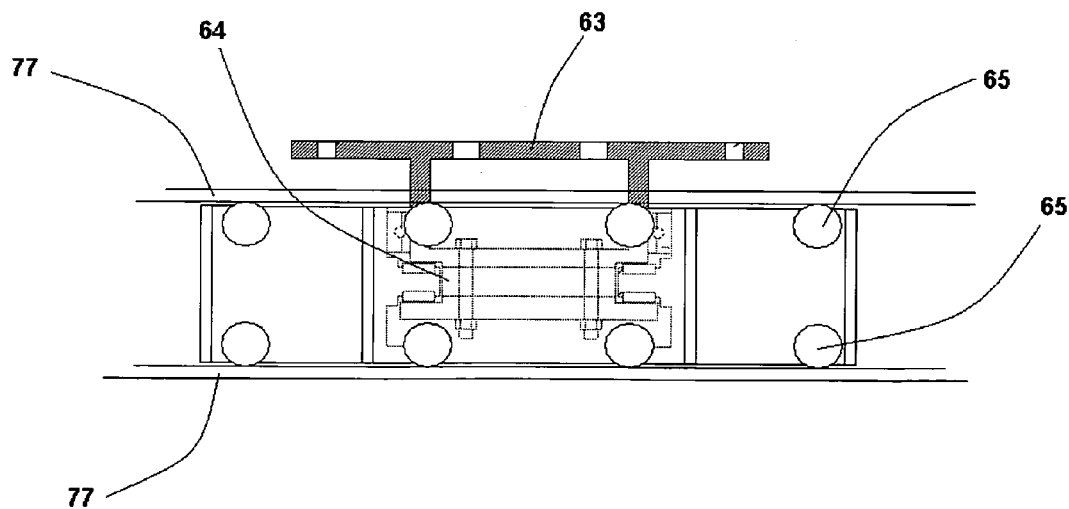
Figure 25:
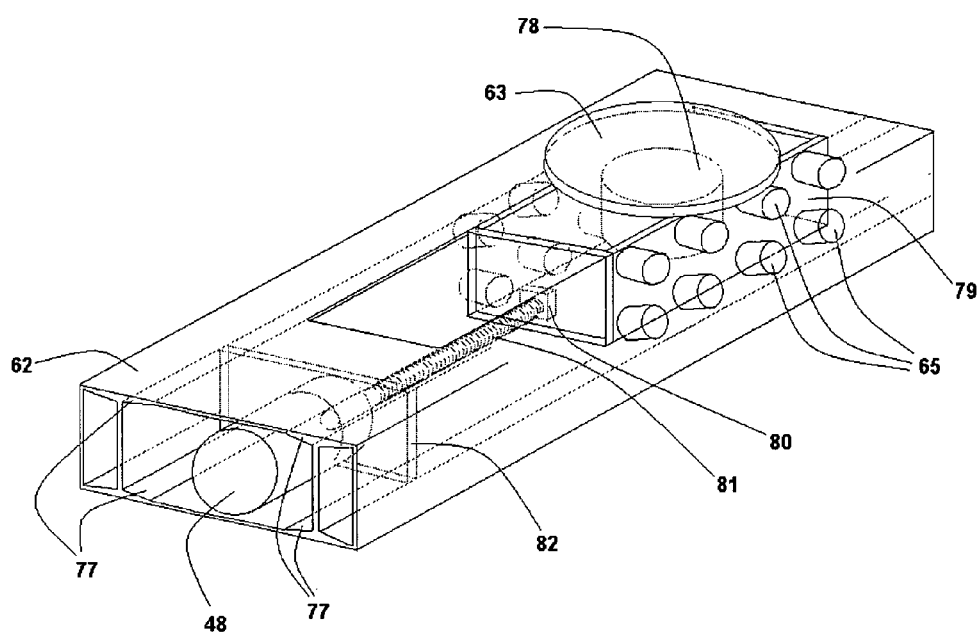
Figure 26:
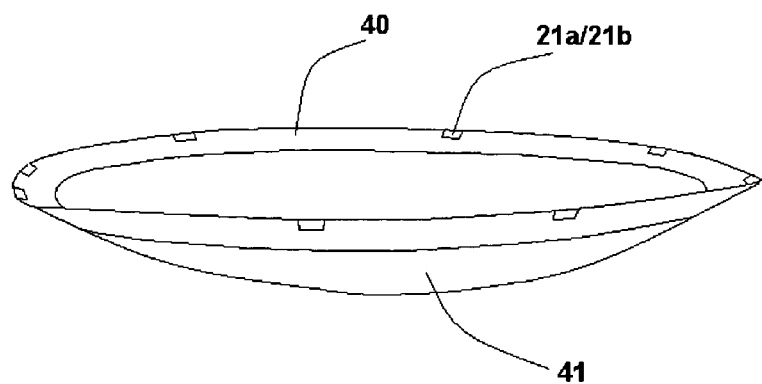
Figure 27:
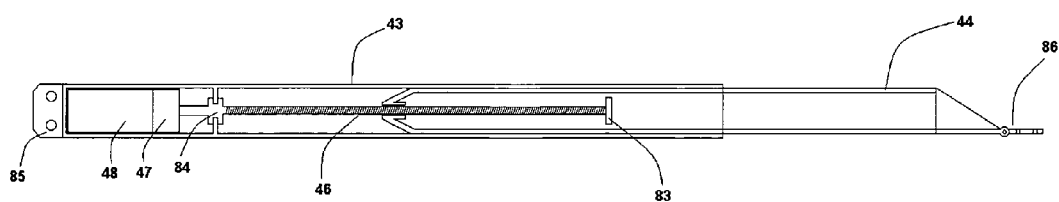
Figure 28:
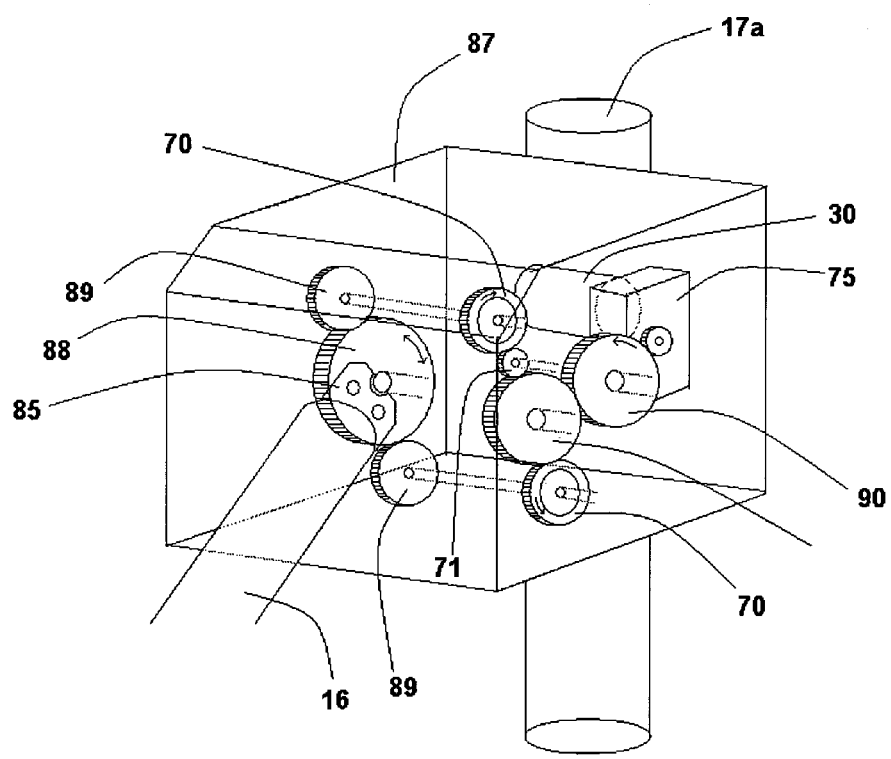
Figure 29:
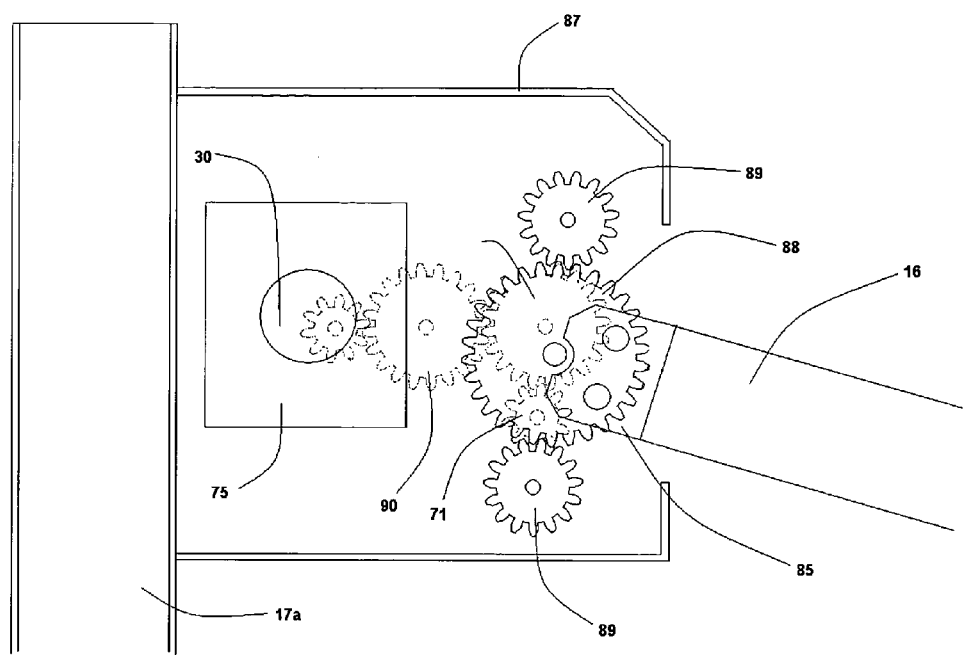
Figure 30:
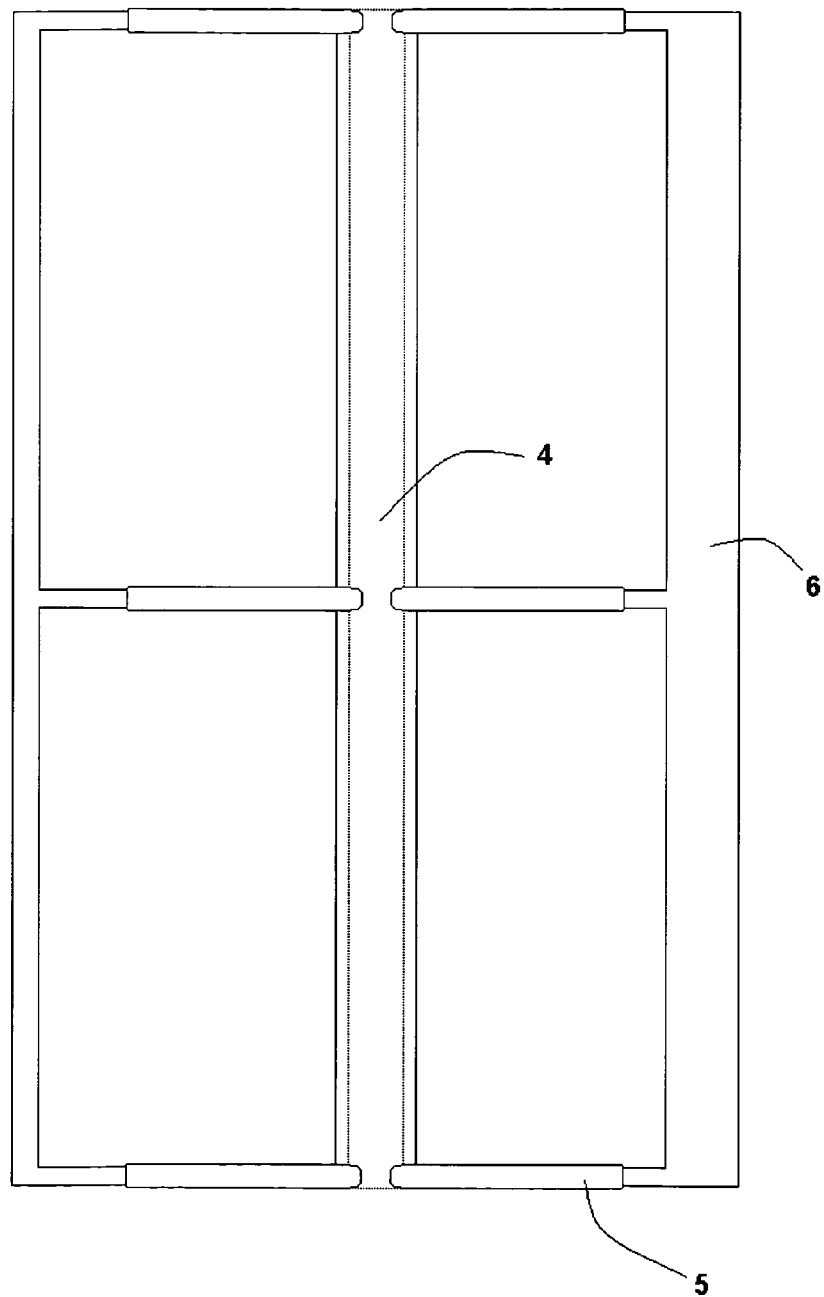
Figure 31:
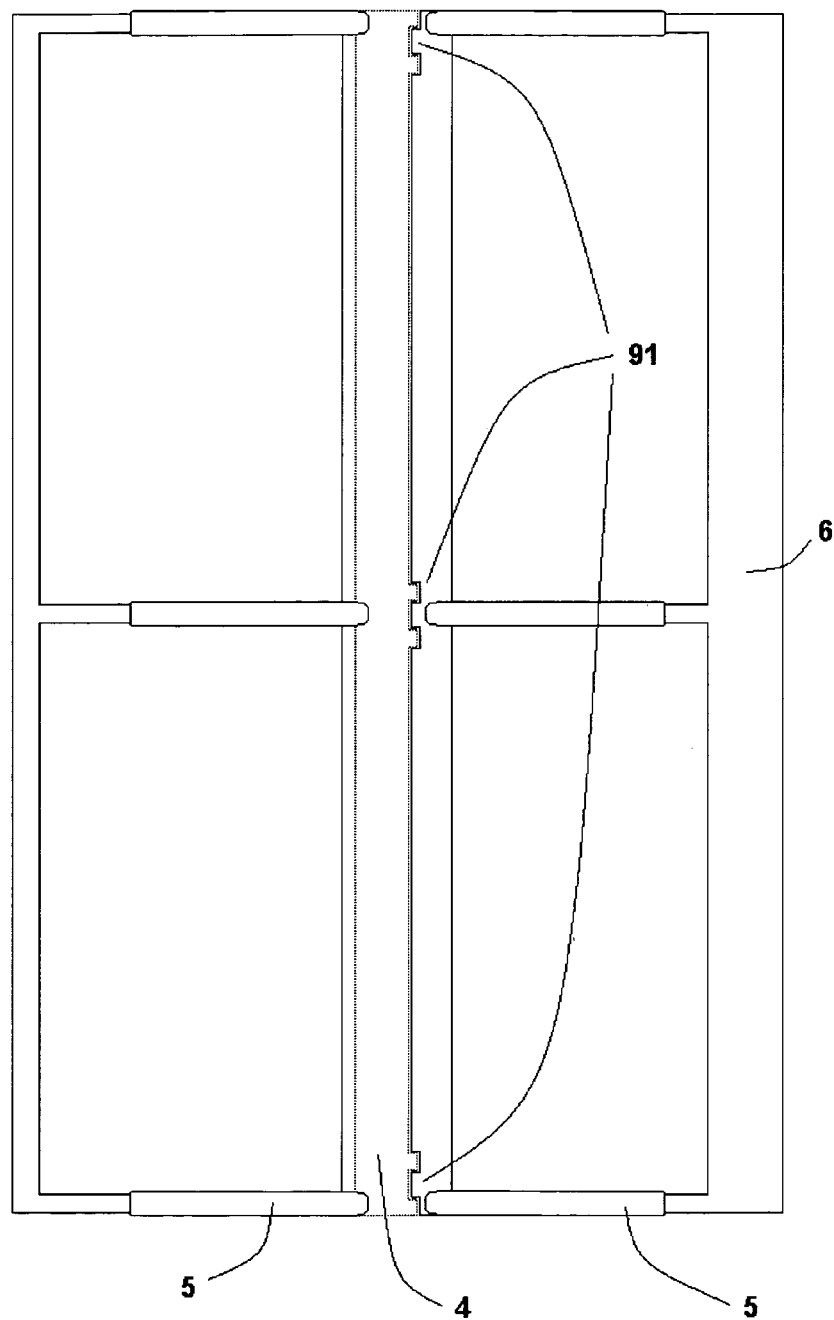
Figure 32:
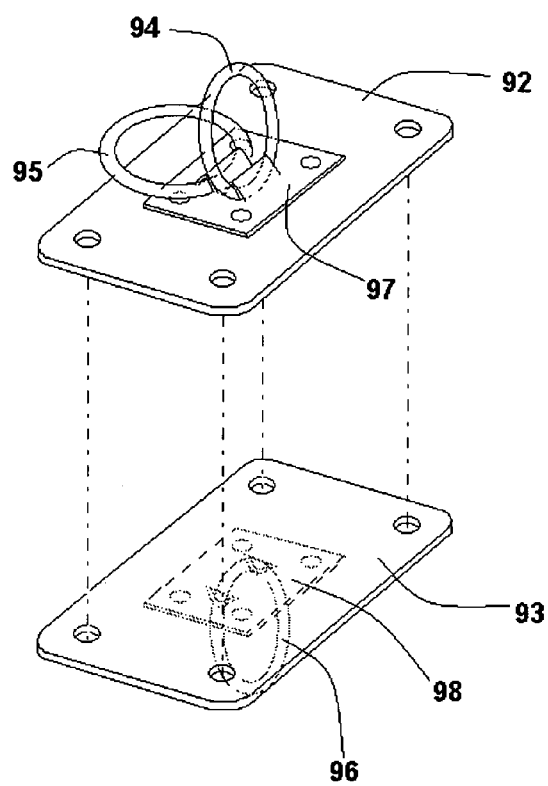
Figure 33:
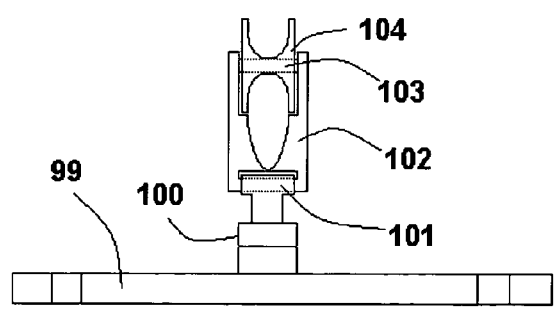
Figure 34:
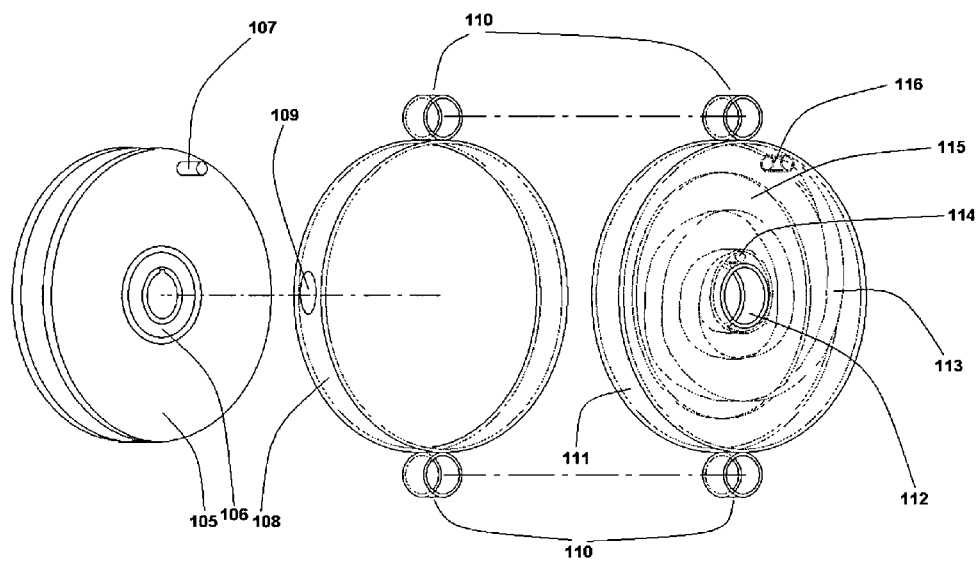
Figure 35:
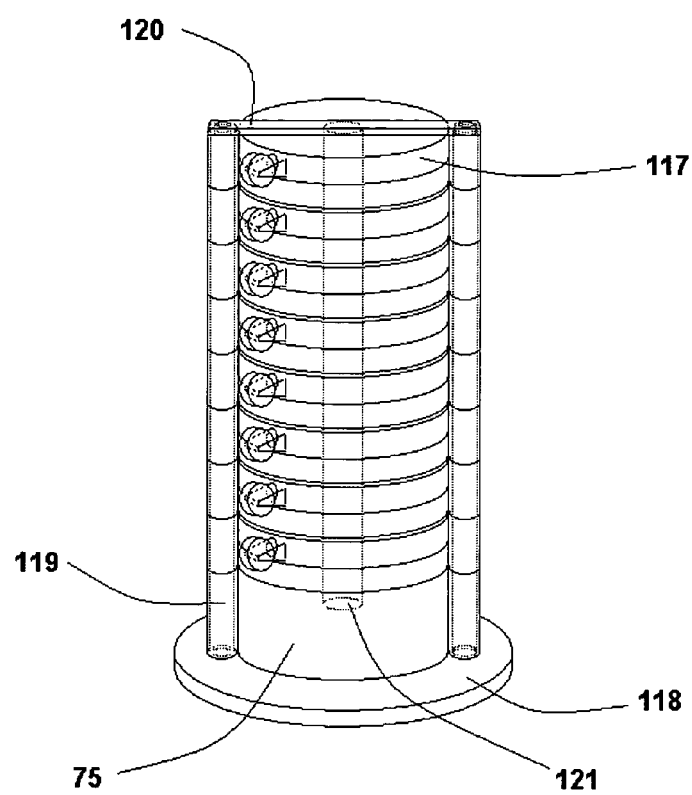
Figure 36:
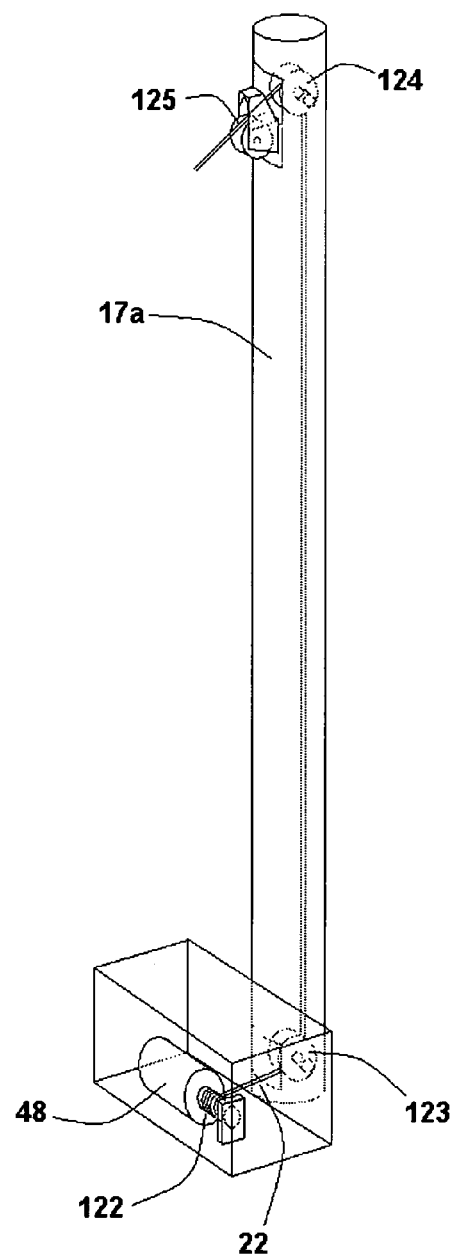
Figure 37:
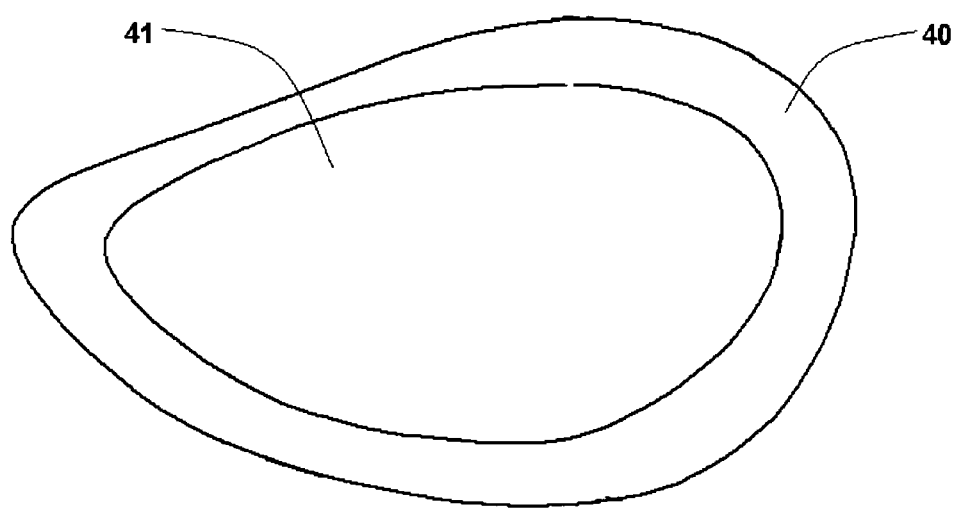
Figure 38:
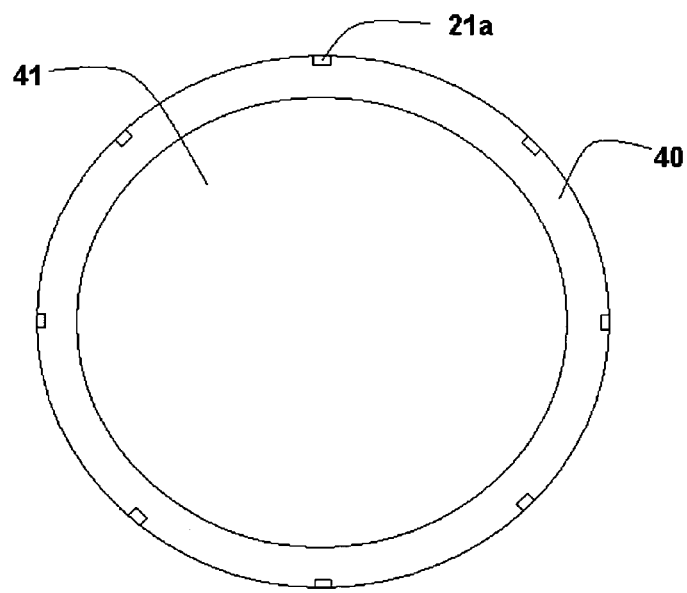
Figure 39:
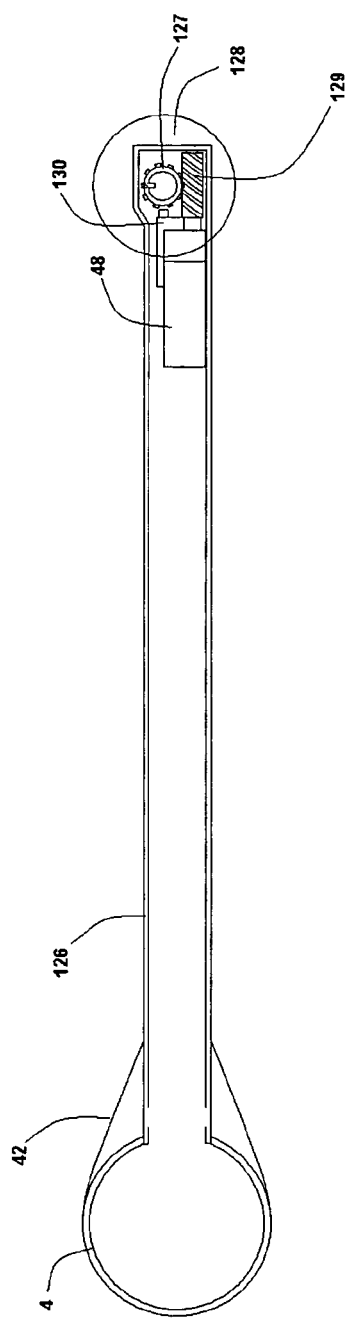
Figure 40:
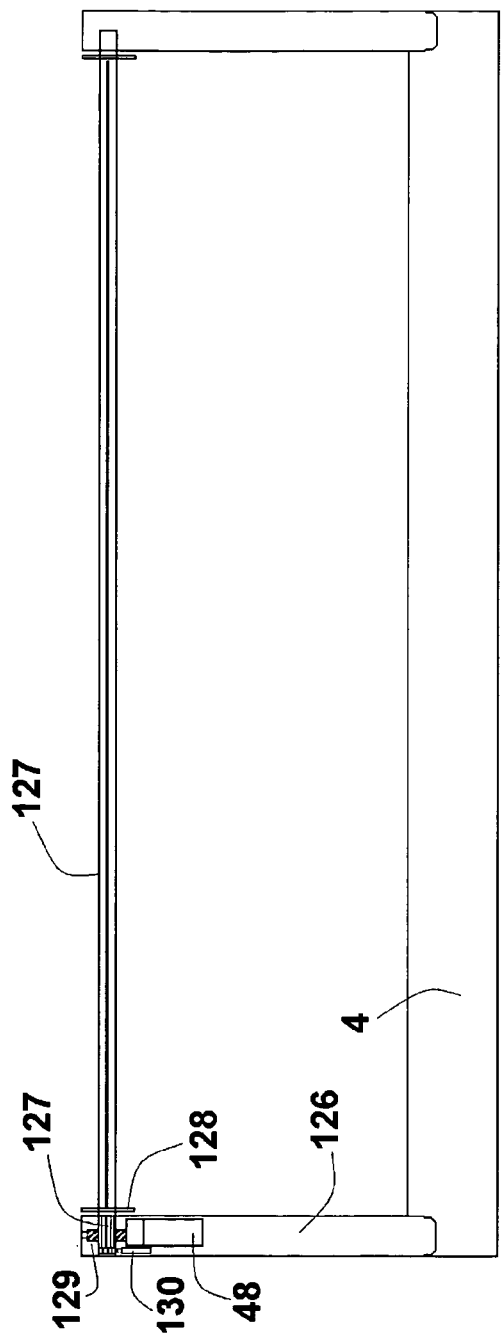
Figure 41:
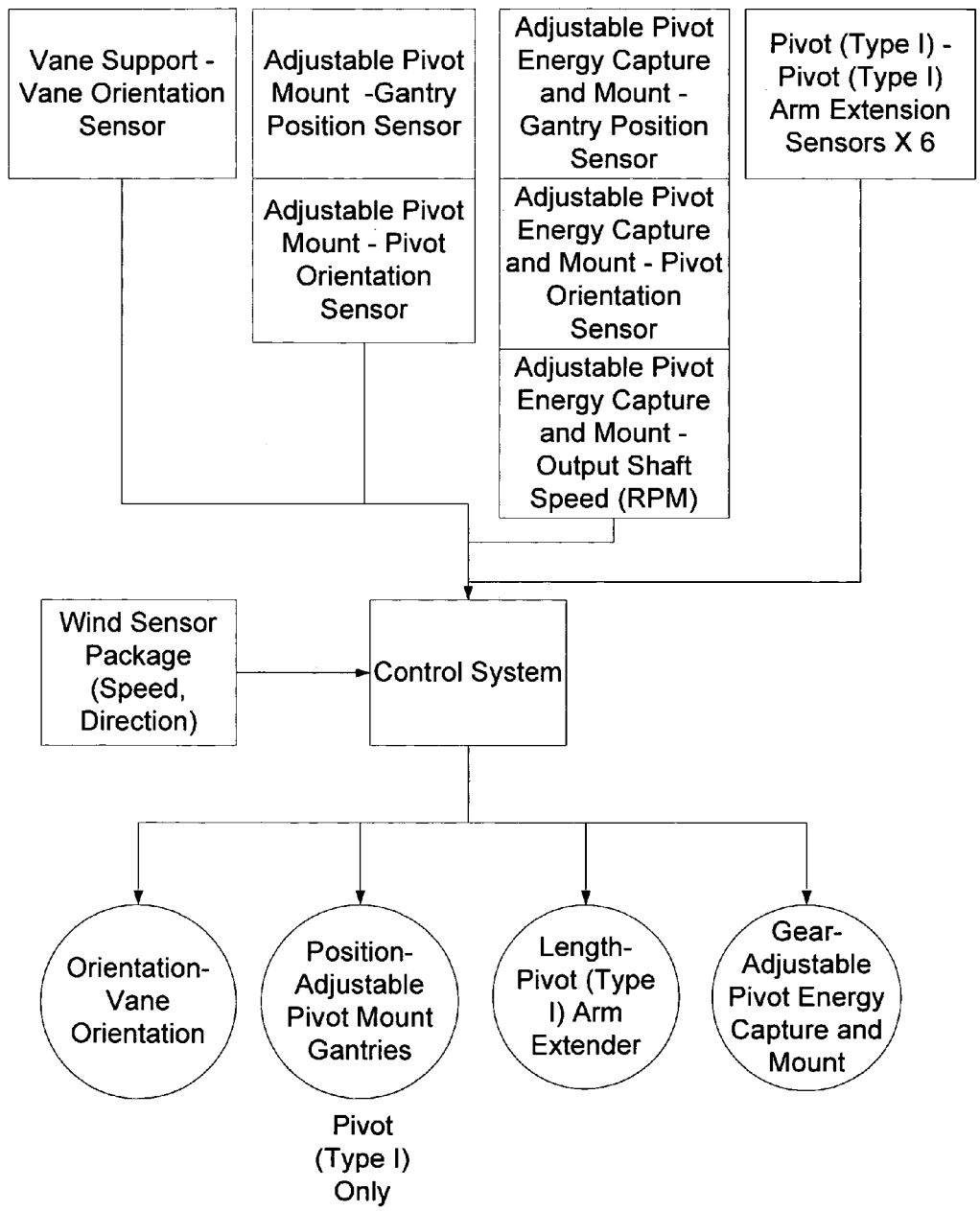
Figures 42, 43, 44, 45, 46:
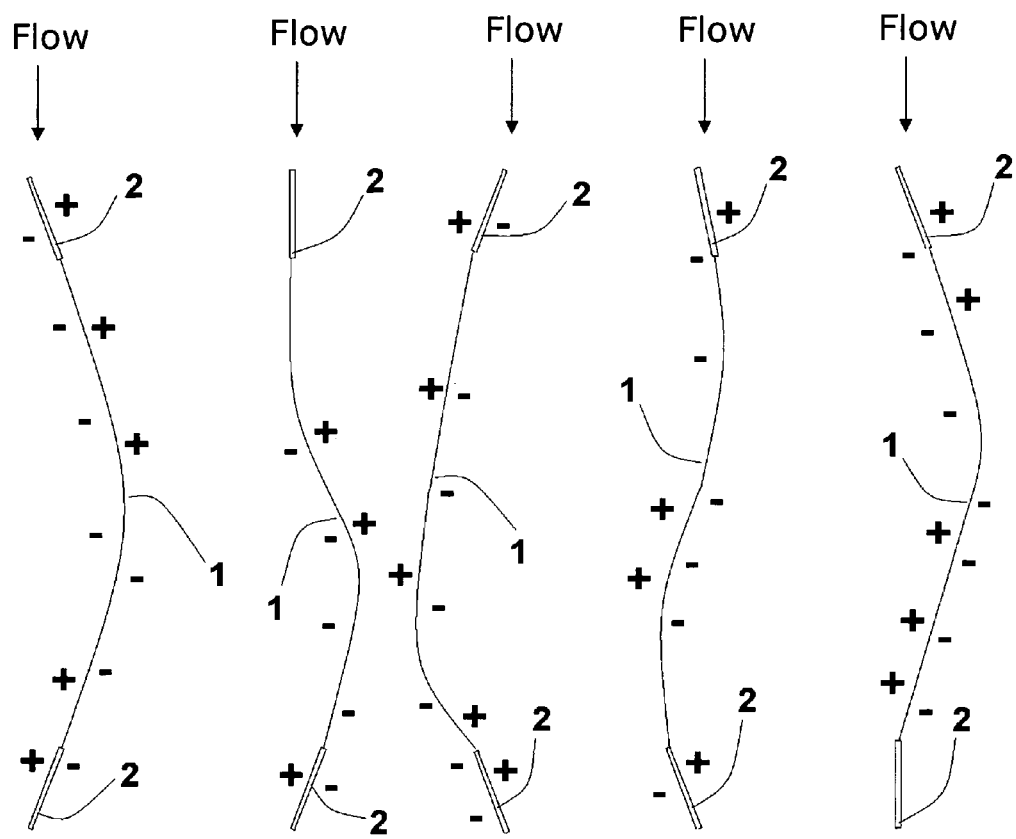

FIG. 10 shows a perspective view of a flexible Sheet (Rectangular Assembly).
FIG. 11 shows a perspective view of a Pivot Type 1 assembly.
FIG. 12 shows a cross-section view of a Pivot Type 1 Arm.
FIG. 13 shows a cross-section view of a Pivot Type 1 Pole.
FIG. 14 shows a side view of a Pivot Type 1 Pole Mounting Base.
FIG. 15 shows a perspective view of a Vane structure
FIG. 16 shows a cross-section view of a Vane.
FIG. 17 shows a perspective view of a Vane cross-section.
FIG. 18 shows a bottom view of a vane.
FIG. 19 shows a cross-section side view of a passive Vane Support.
FIG. 20 shows a cross-section side view of an active Vane support.
FIG. 21 shows a cross-section front view of an Adjustable Pivot Type 1 Energy Capture and Mount (APECM) Assembly.
FIG. 22 shows a cross-section side view of an Adjustable Pivot Type 1 Energy Capture and Mount (APECM) Assembly.
FIG. 23 shows a cross-section front view of an Adjustable Pivot Type 1 Mount (APM) Assembly.
FIG. 24 shows a cross-section side view of an Adjustable Pivot Type 1 Mount (APM) Assembly.
FIG. 25 shows a perspective view of a Gantry and Adjuster Assembly mounted inside a Vane structure.
FIG. 26 shows a perspective view of a Flexible Sheet (Partial Hemispheric) Assembly.
FIG. 27 shows a cross-section view of a Pivot Type 2 Arm Assembly.
FIG. 28 shows a perspective view of Pivot Type 2 Arm Energy Capture and Mount Assembly.
FIG. 29 shows a side view Pivot Type 2 Arm Energy Capture and Mount Assembly.
FIG. 30 shows a side view of a Pivot Type 1 - Two-Side/Single Pivoting Assembly that pivots as a single unit.
FIG. 31 shows a side view of a Pivot Type 1 - Two-Side/Double-Pivoting Assembly that enables both sides to pivot independently of each other.
FIG. 32 shows a perspective view of a Flexible Sheet Cord Mount Assembly.
FIG. 33 shows a cross-section view of a Top and Bottom Energy Capture Cord Sheave.
FIG. 34 shows an exploded view of a Linear-to-Rotational Motion Conversion Mechanism.
FIG. 35 shows a perspective view of a Rotational Force Aggregation Mechanism.
FIG. 36 shows a perspective view of an Active Support/Control Structure Assembly.
FIG. 37 shows a perspective view of a Flexible Sheet (Circular Arched) Assembly.
FIG. 38 shows a top view of a Flexible Sheet (Circular Arched) Assembly.
FIG. 39 shows a cross-section view of a Flexible Sheet Rollup Mechanism.
FIG. 40 shows a side view of a Flexible Sheet Rollup Mechanism mounted to a pivot assembly.
FIG. 41 shows a diagram of a Control System for the preferred embodiment.
FIG. 42 shows a visualization diagram of the first of five steps in a motion cycle of the flexible sheet in the embodiments, overall classified as the Airflow Principle.
FIG. 43 shows a visualization diagram of the second of five steps in a motion cycle of the flexible sheet in the embodiments, overall classified as the Airflow Principle.
FIG. 44 shows a visualization diagram of the third of five steps in a motion cycle of the flexible sheet in the embodiments, overall classified as the Airflow Principle.
FIG. 45 shows a visualization diagram of the fourth of five steps in a motion cycle of the flexible sheet in the embodiments, overall classified as the Airflow Principle.
FIG. 46 shows a visualization diagram of the last of five steps in a motion cycle of the flexible sheet in the embodiments, overall classified as the Airflow Principle.

DRAWINGS—REFERENCE NUMERALS

| Reference Numeral | Reference Name |
|---|---|
| 1 | Flexible Sheet |
| 2 | Pivot |
| 3 | Pivot Mounting Base |
| 4 | Pivot Pole |
| 5 | Pivot Arm |
| 6 | Flexible Sheet Carrier |
| 7 | Vane |
| 8a | Passive Vane Support |
| 8b | An Active Vane Support |
| 9 | Pivot Energy Capture/Mount |
| 10 | Pivot Mount |
| 11 | Gantry/Adjuster |
| 12 | Counterweight |
| 13 | Wind Sensor Package |
| 14 | Control System |
| 15 | Flexible Sheet |
| 16 | Pivot Arm |
| 17a | Passive Support Structure |
| 17b | Passive Support Structure |
| 18 | Pivot Arm Energy Capture/Mount |
| 19a | Two Side/Single Acting Pivot |
| 19b | Two-Side/Double Acting Pivot |
| 20 | Fixed Pivot Mount |
| 21a | Cord Sheet Mount |
| 21b | Pivot Sheet Mount |
| 22 | Support Cord |
| 23 | Support Cord Sheave Block |
| 24 | Bottom Cord |
| 25 | Bottom Cord Sheave Block |
| 26 | Top Cord |
| 27 | Top Cord Sheave Block (Support Structure Mount) |
| 28 | Arcing Support Structure |
| 29 | Rotational Force Aggregation Mechanism |
| 30 | Generator |
| 31 | Support Cord Length Adjuster |
| 32 | Support Structure |
| 33 | Vane Rail Support |
| 34 | Vane Rail |
| 35 | Flexible Sheet |
| 36 | Active Support/Control Structure |
| 37 | Fixed Vane Support |
| 38 | Flexible Sheet Roll-Up Mechanism |
| 39 | Underwater-to-Surface Drivetrain |
| 40 | Flexible Sheet Axial Beam |
| 41 | Flexible Sheet |
| 42 | Pole Fairing |
| 43 | Pivot Arm Primary Tube |
| 44 | Pivot Arm Telescoping Tube |
| 45 | Flexible Sheet Coupler |
| 46 | Threaded Extender Rod |
| 47 | Reduction Gearbox |
| 48 | Servo Gearmotor |
| 49 | Pivot Mount Reinforcement |
| 50 | Vane Support Mount |
| 51 | Counterweight Mount |
| 52 | Upwind/Upstream Pivot Mount Opening |
| 53 | Downwind/Downstream Pivot Mount Opening |
| 54 | Vane Mount Turntable |
| 55 | Turntable Lateral Positioning Bearing |
| 56 | Turntable Bearing |
| 57 | Vane Support Tube |
| 58 | Vane Support Tube Reinforcements |
| 59 | Vane Support Base Mount |
| 60 | Vane Rotation Gear |
| 61 | Vane Support Position Lock |
| 62 | Vane Structure |
| 63 | Pivot Mount Turntable |
| 64 | Turntable Gantry Frame |
| 65 | Gantry Wheels |
| 66 | Turntable Lateral Positioning Bearing |
| 67 | Turntable Output Shaft |
| 68 | Drivetrain Enclosure |
| 69 | Turntable Output Shaft Takeoff Gear |

-continued

| Reference Numeral | Reference Name |
|---|---|
| 70 | One-Way Clutch Bearing and Gear |
| 71 | Direction Reversing Gear |
| 72 | Single Direction Gear |
| 73 | Single Direction Output Shaft |
| 74 | Flywheel |
| 75 | Gearbox |
| 76 | High-speed Output Shaft |
| 77 | Gantry Track |
| 78 | Turntable Assembly |
| 79 | Gantry Frame |
| 80 | Gantry Adjuster Connector Block |
| 81 | Threaded Gantry Position Adjuster Rod |
| 82 | Gantry Position Adjuster Anchor Plate |
| 83 | Pivot Arm Extender Stop |
| 84 | Pivot Arm Extender Anchor |
| 85 | Pivot Arm Mounting Bracket |
| 86 | Connector Hinge |
| 87 | Energy Capture and Mount Enclosure |
| 88 | Input Gear |
| 89 | Pivot (Type II) Direction Differentiating Gears |
| 90 | Spacer Gear |
| 91 | Pivot Hinge |
| 92 | Top Mounting Plate |
| 93 | Bottom Mounting Plate |
| 94 | Top Cord Ring |
| 95 | Support Cord Ring |
| 96 | Bottom Cord Ring |
| 97 | Top Ring Holder |
| 98 | Bottom Ring Holder |
| 99 | Sheave Block Mounting Plate |
| 100 | Swivel |
| 101 | Hinge |
| 102 | Block Body |
| 103 | Sheave shaft |
| 104 | Sheave |
| 105 | Recoil Sheave |
| 106 | One-way Clutch Bearing |
| 107 | Recoil Spring Actuator |
| 108 | Recoil Sheave Cover |
| 109 | Cord Opening |
| 110 | Linear-To-Rotational Motion Unit Securing Guides |
| 111 | Recoil Spring Retainer Cup |
| 112 | Shaft Pass-through hole |
| 113 | Recoil Spring |
| 114 | Recoil Spring Inner Retainer |
| 115 | Recoil Spring Retainer Plate |
| 116 | Recoil Spring Actuator Coupling |
| 117 | Linear-To-Rotational Motion Mechanism |
| 118 | Aggregator Mount Plate |
| 119 | Guide Tube |
| 120 | Securing Bracket |
| 121 | Aggregator Shaft |
| 122 | Winch |
| 123 | Bottom Internal Guide Sheave |
| 124 | Top Internal Guide Sheave |
| 125 | External Guide Sheave |
| 126 | Fixed Arm |
| 127 | Flexible Sheet Rolling Spindle |
| 128 | Rolling Spindle End-Plate |
| 129 | Worm Gear |
| 130 | Spindle Lock |

Detailed Description—Preferred Embodiment
(FIGS. 1, 10, 11, 15, 12, 13, 14, 19, 20, 21, 22, 23, 24, 25, 41)

The perspective view in FIG. 1 shows a Passive Vane Support 8a or Active Vane Support 8b that is to be attached to a flat horizontal foundation.

A Vane 7 then attaches to the top of the Passive Vane Support 8a or Active Vane Support 8b and carries the remaining elements of this embodiment.

A Pivot Mount 10 is carried inside the vane 7 structure within a Gantry/Adjuster 11 at the upwind position from the Passive Vane Support 8a or Active Vane Support 8b. The Gantry/Adjuster 11 is connected to the Control System 14.

A Pivot Energy Capture/Mount 9 is carried inside the vane 7 structure within a Gantry/Adjuster 11 at the downwind position from the Vane Support 8a/8b.

Attached to the upwind-most position on the lower surface of the vane 7, is a Counterweight 12.

Mounted to the Adjustable Pivot Mount 10 is a Pivot 2 whose Pivot pivot arms 5 are designed to move in arc planes parallel to the plane of the Vane 7. This pivot utilizes a large-width Flexible Sheet Carrier as shown in FIG. 1.

Mounted to the Adjustable Pivot Energy Capture and Mount 9 assembly is another Pivot 2, whose Pivot pivot arms 5 are designed to move in arc planes parallel to the plane of the Vane 7. This pivot utilizes a small-width Flexible Sheet Carrier as shown in FIG. 1.

Suspended between the two Pivot assemblies 2 is a Flexible Sheet 1, attached via the Flexible Sheet Carrier 6 present on each Pivot assembly 2. The distance between the two Pivot assemblies 2, in conjunction with the level of the extension of the Pivot pivot arms 5 determines the level of curvature imparted to the Flexible Sheet assembly 1.

Atop one of the Pivot assemblies 2, a Wind Sensor Package 13 is attached. Contained within the Passive Vane Support 8a or Active Vane Support 8b is a Control System 14.

The Passive Vane Support 8a shown in FIG. 19 consists of a Vane Support Base Mount 59 attached to a Vane Support Tube 57 and supported by Vane Support Tube Reinforcements 58.

Attached to the interior of the Vane Support Tube 57 is a Turntable Bearing 56 structure supporting the Vane Mount Turntable 54. A Turntable Lateral Positioning Bearing 55 provides lateral support to the Vane Mount Turntable 54.

The Active Vane Support 8b shown in FIG. 20, in addition to the components of the Passive Vane Support 8a, includes a Servo Gearmotor 48, that meshes with the Vane Rotation Gear 60. A Vane Support Position Lock 61 also meshes with the Vane Rotation Gear 60.

Steel would be the standard material for the production of the Vane Supports 8a/8b, and due to the large stresses involved in carrying the weight and dynamic forces generated by the embodiment in FIG. 1, requires a very high strength structure and durable Turntable Bearing 56.

The Vane 7 shown in FIGS. 15, 16, 17, and 18 consists of a high strength box structure enclosing twin I-Beam structural shapes. (See section view in FIG. 16 and perspective view in FIG. 17)

In FIG. 18, attached to the Vane 7, is a Vane Support Mount 50 to enable connection to the Passive Vane Support 8a or Active Vane Support 8b. A Counterweight Mount 51 is attached at the upwind end of the Vane 7, to enable connection of a Counterweight 10 (FIG. 1) to counterbalance the extended downwind end of the Vane 7.

Also shown in FIGS. 18 and 15 are the Upwind/Upstream Pivot Mount Opening 52 and the Downwind/Downstream Pivot Mount Opening 53, to enable mounting of the Pivot Energy Capture/Mount 9 and Adjustable Pivot Mount Assembly 10.

FIGS. 21 and 22 show a cross-section and side view of the Pivot Energy Capture/Mount 9. This assembly consists of a Pivot Mount Turntable 63 that enables connection to a Pivot Assembly 2. The Pivot Mount Turntable 63 is supported vertically by a Turntable Gantry Frame 64 and laterally by a Turntable Lateral Positioning Bearing 66.

Attached to the Turntable Gantry Frame 64 are a plurality of Gantry Wheels 65, and the Drivetrain Enclosure 68. The Gantry Wheels 65 roll upon tracks created by the I-Beam structure within the Vane Structure 62.

A Turntable Output Shaft 67 attaches to the Pivot Mount Turntable at its top end and meshes with two Turntable Output Shaft Takeoff Gears 58 to via a gear attached at the Turntable Output Shaft 67 bottom end.

The Turntable Output Shaft Takeoff Gears 69 drive via two separate shafts, two One-way Clutch Bearing and Gear assemblies 70. The left One-way Clutch Bearing and Gear 70 (As shown in FIG. 21) rotates in drive mode in the opposite direction to the right One-way Clutch Bearing and Gear in drive mode. The right One-way Clutch Bearing and Gear 70 meshes with a Direction Reversing Gear 71 that reverses the output direction before meshing with the Single Direction Gear 72. The Single Direction Gear 72 drives the Single Direction Output Shaft 73.

The Single Direction Output Shaft 73 is attached to a Flywheel 74, that is then attached to a Gearbox 75. The Gearbox 75, is a prior art in the format of a multi-stage planetary drive with bands similar to that found in an automobile's automatic transmission, enabling multiple output gear ratios. Attached to the Gearbox 75 is a High-Speed Output Shaft 76.

As shown in FIG. 22, the High-Speed Output Shaft 76, connects to a Generator 30.

The Adjustable Pivot Mount assembly 10 in FIG. 1, is further explained in FIGS. 23 and 24. Its structure mimics the Pivot Energy Capture/Mount (11 on FIG. 1 and detailed in FIGS. 21 and 22) but does not include the Turntable Output Shaft (67 on FIG. 21) or any drive train components.

The Turntable Gantry (64 in FIGS. 21, 22, 23, 24) is shown in perspective view in FIG. 25. A Pivot Mount Turntable 63 and Turntable Assembly 78 are mounted within the Gantry Frame 79, which in turn is carried within the Vane Structure 62 via Gantry Wheels 65 that ride upon the Gantry Tracks 77.

To control the position of the Turntable Gantry (as shown in FIG. 25), a Threaded Gantry Position Adjuster Rod 81 is attached to the end of the Gantry Frame 79 via a Gantry Adjuster Connector Block 80. This threaded rod then attaches to a Servo Gearmotor 48 after passing through the Gantry Position Adjuster Anchor Plate 82.

FIG. 11 shows the Pivot Assembly (2 in FIGS. 1, 3, 5, and 8). This assembly consists of a Pivot Pole Mounting Base 3 that is connected to a Pivot Pole 4. The pole is then connected to three Pivot Arms 5. The Pivot Arms 5 connect to a Flexible Sheet Carrier 6.

FIG. 14 shows a side-view of the bottom of the Pivot Assembly (FIG. 11) in detail. The Pivot Mounting Base 3 is reinforced by Pivot Mount Reinforcements 49. The diagram also shows the bottom portion of the Pivot Pole 4.

FIG. 13 shows a cross-section of the Pivot Assembly (FIG. 11). Attached to and surrounding the Pivot Pole 4 is a Pivot Pole Fairing 42. Because the Pivot Pole Fairing 42 is not structural, it may be constructed of lightweight, bendable and durable plastic or composite material.

FIG. 12 shows a cross-section of the Pivot Arm (5 on FIG. 11). The Pivot Pole 4 is shrouded by the Pivot Pole Fairing 42. Attached to the Pivot Pole 4 is the Pivot Arm Primary Tube 43. A Pivot Arm Telescoping Tube 44 of smaller diameter than the Pivot Arm Primary Tube 43, and composed of a tube section and female threaded coupler slides inside of the Pivot Arm Primary Tube 43 and connects to the Pivot Arm Primary Tube 43 via a Threaded Extender Rod 46. The Threaded Extender Rod 46 is attached to the Pivot Arm Primary Tube 43 via Pivot Arm Extender Anchor 84, and has a Pivot Arm Extender Stop 83 mounted at the end.

A Servo Gearmotor 48 is attached to the Threaded Extender Rod 46 and itself attaches to the inside diameter of the Pivot Pole 4.

Attached to the Pivot Arm Telescoping Tube 44 is the Flexible Sheet Carrier 6, which includes a Flexible Sheet Coupler 45. The Flexible Sheet Carrier and Coupler may preferably be constructed of a high durometer polymer or a highly shock and fatigue resistant plastic such as Puck Board.

FIG. 10 shows the Flexible Sheet. This assembly connects to the Pivot Assemblies (2 on FIG. 1) via the Flexible Sheet Coupler (45 on FIG. 12) portion of the Flexible Sheet Carriers (6 on FIG. 12). This assembly is composed of a rectangular Flexible Sheet 41 of material (Current knowledge points to the use of Polyester sail cloth, a plastic film or another synthetic material capable of withstanding force and weather elements) The Flexible Sheet is given support along the axis that runs perpendicular to the Flexible Sheet Carrier (6 on FIG. 12), by utilizing two Flexible Sheet Axial Beams 40. Each beam consists of a piece of flexible and durable material that possesses a beam like quality along its length, but that has minimal lateral strength. The wider the strip of this material, the more Beam effect is imparted. A side effect of a wider strip is that more rigidity is imparted laterally. These qualities enable curvature to be imparted to the Flexible Sheet. Current knowledge would suggest that a material such as Puck Board possesses the right qualities for all but the most frigid environments. Current knowledge also suggests that a singular sheet of durable film-like material may satisfy both the beam and lateral bending requirements.

Operation—Preferred Embodiment (FIGS. 1, 42-46, 21, 22)

In the Embodiment Shown in FIG. 1, the Wind Flow Approaches the Upwind End of the Vane 7, and strikes the leading edge of the upwind Flexible Sheet Carrier 6 that splits the airflow at this point.

The airflow moves downwind alongside the curvature of the Flexible Sheet 1, generating lift via the angle of attack presented by the Flexible Sheet Carrier 6 arc position relative to concave shape generated by the curvature of the Flexible Sheet 1 (See FIGS. 42-46. In these figures, the "−" symbols indicate areas of negative pressure or lift, and the "+" symbols indicate areas of positive pressure).

The lift force creates a curvature near the upwind edge of the Flexible Sheet 1, causing the Flexible Sheet 1 to pull itself toward the negative air pressure area generating the lift. This pulling force in turn causes the Pivot arms 5 of the downwind Pivot 2 to pull in the same direction as the lift. The concave curvature cascades down the Flexible Sheet 1 as demonstrated in FIGS. 42-44, creating a low-pressure region on the concave side of the Flexible Sheet 1 as it goes. This causes a further pulling force to be applied to the Pivot arms 5 of the downwind Pivot 2, causing them to move to their full extent of travel on the side of the Flexible Sheet 1 where the low pressure region was cascading. This travel is limited by the tension of the Flexible Sheet 1 between the upwind and downwind Pivot 2 assemblies.

Once the downwind Pivot arms 5 are at the full extent of travel, the Flexible Sheet Carrier 6 on the upwind Pivot 2 is oriented in the same direction as the Pivot arms 5 on the downwind Pivot 2. This creates a new splitting of the airflow, with the concave curvature on the opposite side of the Flexible Sheet 1. This new curvature generates lift in the opposite direction, and the cycle described above is repeated.

The pivoting action of the downwind Pivot 2 (and optionally, if so mounted on the same Pivot Energy Capture/Mount 10, the upwind Pivot 2) is translated into a single direction rotational motion via the Pivot Energy Capture/Mount 10 and then finally to electrical energy (in this embodiment) via a generator.

The detailed operation of the Pivot Energy Capture/Mount 10 is as follows (Refer to FIG. 21, except where noted):

The pivoting action of the downwind (in this embodiment) Pivot 2 cycles its Pivot Mounting Base (3 on FIG. 11) clockwise and counter-clockwise, imparting this motion and generated force to the Pivot Mount Turntable 63. This motion is then transmitted into the Turntable Output Shaft 67 whose gear then transmits the motion into the two Turntable Output Shaft Takeoff Gears 69. These gears then drive, via shafts, two One-Way Clutch Bearing and Gear assemblies 70.

For a given Pivot Mounting Base (3 on FIG. 11) pivoting direction (Clockwise or counter-clockwise), one of the two One-way Clutch Bearing and Gear assemblies 70 transmits motion and force directly to the gear attached to the top of the Single Direction Output Shaft 73. The gear on the Single Direction Output Shaft 73 rotates in its predefined rotation direction, in turn driving the Direction Reversing Gear 71 that it meshes with as well. Due to the second One-way Clutch Bearing and Gear assembly 70 utilizing the opposite rotation direction as its drive direction, the rotation imparted to this second One-way Clutch by the Direction Reversing Gear 71 causes it to freewheel.

Conversely, when the pivoting motion of the Pivot Mounting Base (3 on FIG. 11) is reversed, the second One-way Clutch Bearing and Gear assembly 70 becomes the driver, and by meshing with the Direction Reversing Gear, translates it's opposite rotation into the same direction as that predefined for the Single Direction Output Shaft 73 and transmits this motion and force into the Single Direction Output Shaft 73.

Once the motion and force from both pivoting directions is translated into a single rotational direction, this force and motion is then transmitted into a flywheel which stores the energy for more consistent delivery to the Generator (30 in FIG. 22. The energy stored in the flywheel is then transmitted into the Gearbox 75 where it increases the rotational speed and outputs this motion and force via a High Speed Output Shaft 76 to a Generator (30 in FIG. 22)

Referring to FIG. 1, to optimize energy capture from various wind speeds, the embodiment makes use of Pivot 2 spacing adjustments. These adjustments are accomplished by adjusting the position of the Adjustable Pivot Energy Capture and Mount 9 and Adjustable Pivot Mount 10 via their respective Gantry and Adjuster assemblies 11.

At low wind speeds, the spacing between the Pivot 2 assemblies can be reduced, introducing a larger curvature into the Flexible Sheet 1. This creates a more significant lift force via the larger apparent camber created in the cascading curvature. At low wind speeds, flow separation is less likely to occur on a larger cambered surface, and hence this operation, in conjunction with a large increase in output revolutions via the Gearbox (75 on FIG. 22) can drive the Generator (30 on FIG. 22) with a maximum level of force for the available wind.

At high wind speeds, the spacing between the Pivot 2 assemblies can be increased, reducing the curvature of the Flexible Sheet 1. This creates a reduced camber for high wind speeds, ensuring that the force of the wind does not overload the structure of the embodiment. At the same time it increases the oscillation rate, enabling a reduction in gearbox output speed multiplication while increasing the torque to enable higher levels of energy generation.

In extreme winds, the spacing between the Pivot 2 assemblies can be further increased, effectively removing all camber from the Flexible Sheet 1. This results in no pivot action as no camber is presented to the wind flow, and the Vane 7 effectively functions as a passive wind vane, saving the embodiment from damage.

A second dimension to the optimization at various wind speeds is the use of the Pivot Arms 5 which incorporate the ability to adjust pivot arm length.

The arm length at various wind speeds affects the formation and cascading effect of the curvature in the Flexible Sheet 1, and can be optimized depending on the wind speed to ensure maximum energy capture.

The Passive Vane Support 8a enables the embodiment to automatically orient itself into the wind flow. The positioning of the Passive Vane Support 8a enables the bulk of the aerodynamic lift generated by the Flexible Sheet 1 to act on the majority downwind portion of the Vane 7, orienting it automatically into the oncoming wind. In an active mode, the Active Vane Support 8b can orient the vane into the wind using wind direction data obtained from the Wind Sensor Package 13.

Detailed Description—Alternate Embodiment
(FIGS. 2, 26, 27, 28, 29)

The Perspective in FIG. 2 shows a series of Passive Support Structures 17a (Poles) arranged in a equally distanced fashion in a circular shape. These poles 17a are attached or embedded into a horizontal foundation. Mounted to one of the Passive Support Structures 17a is a Control System 14 and a Wind Sensor Package 13.

Mounted to each Passive Support Structure 17a (Poles) is a Pivot Arm Energy Capture/Mount 18. Then, attached to each Pivot Arm Energy Capture/Mount 18 is a Pivot Arm 16.

Each Pivot Arm 16 then attaches to the Flexible Sheet Assembly 15 around it's circumference at equally spaced distances, suspending the Flexible Sheet Assembly 15 at a distance above the ground.

Mounted to one of the Passive Support Structures 17a is a Control System 14 box that is connected to the Wind Sensor Package 13. The Control System also connects to each Pivot Arm Energy Capture/Mount 18 to enable control.

The Pivot Arm Energy Capture/Mount as shown in FIGS. 28 and 29 is housed within a Energy Capture and Mount Enclosure 87 and connects to a Pivot Arm 16 via a Pivot Arm Mounting Bracket 85 that attaches to the Input Gear 102. This input gear serves the same function as the Turntable Output Shaft and Gear assembly (67 in FIG. 21) described in the preferred embodiment. The remaining drivetrain, up until the Spacer Gear 90, including the Direction Differentiating Gears 89 (Equivalent to Turntable Output Shaft Takeoff Gears 69 in FIG. 21), One-way Clutch Bearing and Gears 70, Direction Reversing Gear 71, Single Direction Gear 72 and corresponding Single Direction Output Shaft 73 are meshed/connected identically to the Pivot Energy Capture/Mount (FIG. 21) referred to in the preferred embodiment.

Meshed to the Single Direction Output Gear 72 is the Spacer Gear 90 that could suitably be replaced with a flywheel/gear combination. The Spacer Gear meshes to the Gearbox 75 via an external input. The Gearbox 75 is then connected to the Generator 30.

The Pivot Arm shown in FIG. 27, is constructed in the same fashion as the Pivot Arm Assembly shown in FIG. 12, with the following exceptions:

The Pivot Arm (16 in FIG. 28) utilizes a Pivot Arm Mounting Bracket directly attached the Input Gear (88 in FIG. 28).

The Pivot Arm (16 in FIG. 28) replaces the Flexible Sheet Carrier (6 in FIG. 12) and Flexible Sheet Coupler (45 in FIG. 12) with a Pivot Arm to Flexible Sheet Connector Hinge 86.

The Flexible Sheet assembly as shown in FIG. 26 is composed of Flexible Sheet 41, formed from individual panels similar to a parachute, that is fastened to a Flexible Sheet Axial Beam 40 in a circular loop shape that runs around the circumference of the partial hemispheric shape. Attached to the Flexible Sheet Axial Beam 40 are a series of Pivot Sheet Mounts 21*b*, which are not shown but would be comprised of top and bottom plates fitted to both sides of the Flexible Sheet Axial Beam 40 in the same location on the circumference, and have attachment holes for the Pivot Arm to Flexible Sheet Connector Hinges 86 to attach to.

Operation—Alternate Embodiment—FIG. 2

In the embodiment shown in FIG. 2, a wind flow strikes the circumference of the Flexible Sheet assembly 15, and is split into two separate flows above and below, in the same manner described for the preferred embodiment in FIG. 1. Also, like the embodiment in FIG. 1, the motion of the Flexible Sheet assembly 15, functions according to the Airflow Principle shown in FIGS. 42-46. Different from the embodiment of FIG. 1, this embodiment operates in a horizontal plane, with an initial static position that includes a curvature built into the Flexible Sheet assembly 15. The shape is best described as an inverted parachute.

As the airflow generates lift near the upwind edge of the circumference, on the concave side of the Flexible Sheet assembly 15, it causes the upwind edge to lift vertically raising the ends of the Pivot Arms 16 nearest the leading edge, and transferring that motion into their respective Pivot Arm Energy Capture/Mounts 18. As the curvature continues to cascade along the Flexible Sheet assembly 15 toward the downwind side of the circumference, the Pivot Arms 16 at right angles to the wind flow are also raised vertically, imparting their motion and force to their respective Pivot Arm Energy Capture/Mounts 18.

The curvature ultimately reaches the downwind edge of the Flexible Sheet assembly 15, lifting the Pivot Arms 16 attached this edge, imparting their motion and force to their respective Pivot Arm Energy Capture/Mounts 18.

At the same time as the curvature reaches the downwind edge, the shape of the Flexible Sheet assembly 15 appears inverted from its static position, similar to that of a standard parachute. It is raised above it's normal static position.

Like the preferred embodiment, the shape created by the Flexible Sheet assembly 15 would at this stage create a concave shape facing the Passive Support Structure 17*a* mounting surface, causing the same cascading cycle as previously noted. Starting at the upwind edge of the Flexible Sheet assembly 15, the arms would be progressively pulled down toward the Flexible Sheet assembly 15 static position, at which time the cycle would repeat.

The process for converting the pivoting motion from the Pivot Arms to electrical energy is the same as that mentioned in the preferred embodiment.

The Control System 14, interfaced to the Wind Sensor Package 13 controls the Servo Gearmotors 48 in each of the Pivot Arms 16, enabling control over the Flexible Sheet assembly 15 in varying wind speed conditions. Control may also be exerted over the gear ratios selected in the Gearbox (75 in FIG. 28) to compensate for slower or faster oscillation rates.

Within the standard operating range of wind speeds, the Pivot Arms 16 can be adjusted to a length that places the Flexible Sheet assembly 15 into position to capture the wind's energy.

At lower wind speeds, the Pivot Arms 16 can be extended in such a way as to introduce a larger angle of attack at the upwind edge of the Flexible Sheet assembly 15, enabling more efficient capture at these speeds.

At higher wind speeds, the angle of attack may be reduced through contraction of the Pivot Arms 16.

At damaging wind speeds, the arms can be extended fully to lower the embodiment to the ground preventing damage.

Detailed Description—Alternate Embodiment—FIG. 3

The embodiment shown in FIG. 3 utilizes the same Vane Support assemblies 8*a* or 8*b* as the preferred embodiment, and the same essential Vane 7 structure. However, in this embodiment, there are three pivot assemblies supported at three locations along then length of the Vane 7.

The downwind-most Pivot assembly 2 and the center Pivot—Two Side/Single Pivoting 19*a* or Pivot—Two Side/Double Pivoting 19*b*, are referred to here as Pivots 3 and 2 respectively. They are both mounted to Pivot Energy Capture/Mounts 9. The upwind-most Pivot assembly 2, referred to here as Pivot 1 is mounted to a Fixed Pivot Mount 20. Suspended between Pivots 1 and 2 is a Flexible Sheet 1 as described in the preferred embodiment. Suspended between Pivots 2 and 3 is another Flexible Sheet 1 as described in the preferred embodiment.

The energy capture mechanisms are identical in design and operation to that described in the preferred embodiment.

The Vane Support 8*a* or 8*b* is positioned upwind of the center pivot in this embodiment.

As shown in FIG. 30, the Pivot—Two Side/Single Pivoting assembly (19*a* in FIG. 3) is composed of two Pivot pivots, sharing a common Pivot Pole 4. The left-hand side of this joined pivot utilizes a small-depth Pivot Sheet Carrier 6, while the right-hand side utilizes a large-depth Pivot Sheet Carrier 6. The base structure and arm construction is identical to the preferred embodiment.

As shown in FIG. 31, the Pivot—Two Side/Double Pivoting assembly (Not shown in FIG. 3) is composed of two Pivot pivots, sharing a common Pivot Pole 4. The left-hand side Pivot Arm assemblies 5 are joined firmly to the Pivot Pole 4, while the right-hand side utilizes Pivot Hinges 91 that provide freedom of motion in its arc plane independent from the left-hand side. The left-hand side of this pivot utilizes a small-depth Pivot Sheet Carrier 6, while the right-hand side utilizes a large-depth Pivot Sheet Carrier 6. The base structure and arm construction is identical to the preferred embodiment.

The design of the mechanical components in this embodiment is identical to the preferred embodiment with the exception of those things noted in the description.

Operation—Alternate Embodiment—FIG. 3

In the embodiment show in FIG. 3, the action of the two separate Flexible Sheets 1 are synchronized through the employment of the Pivot—Two Side/Single Pivoting assembly 19*a* (See FIG. 30). The airflow, once it has effected lift on the upwind Flexible Sheet 1, continues downwind and effects lift further on the downwind Flexible Sheet 1. Through appropriate Pivot spacing and Pivot arm length, as described in the preferred embodiment the two Flexible Sheets 1 can be made to work co-operatively. The Single pivoting action two sided pivot ensures the aerodynamic lift acts on the opposite sides of the upwind and downwind Flexible Sheets (Rectangular) assemblies 1.

To utilize a more passive approach to synchronization, the Pivot—Two Side/Double Pivoting assembly 19*b* is employed. Through appropriate Pivot spacing and Pivot arm length, as described in the preferred embodiment the two Flexible Sheets 1 can be made to work co-operatively. The Double pivoting action two sided pivot ensures the aerodynamic lift acts naturally on the opposite sides of the upwind and downwind Flexible Sheets 1, according to the initial effect of the upwind Flexible Sheet 1.

This embodiment employs the same Control System and Wind Sensor Package as the preferred embodiment, with the exception that its operation includes management of the additional Pivot—Two Side/Single Pivoting assembly 19a or Pivot—Two Side/Double Pivoting assembly 19b.

The two Pivot Energy Capture/Mounts 9 both convert energy.

The location of the Vane Support 8a/8b upwind from the center pivot pole allows the bulk of the aerodynamic force to be applied downwind, of this support, and hence will enable the Vane 7 to move automatically into the wind via an action similar to a standard wind vane.

The operation of this embodiment is identical to the preferred embodiment with the exception of those things noted in this operational description.

Detailed Description—Alternate Embodiment—FIG. 4

The embodiment shown in FIG. 4 utilizes a number of similar structures/component types as the embodiment in FIG. 2 previously described, with the following exceptions:

The Passive support structures (17a on FIG. 2), Pivot Arm Energy Capture/Mounts (18 in FIG. 2), and Pivot Arms (16 on FIG. 2) are replaced with Arcing Support structures 28, the bottom portions thereof described as Active Support/Control Structures 36.

In place of the Pivot Arms (16 on FIG. 2) as the pivoting connection/support for the Flexible Sheet assembly, Support Cords 22 are used to connect the Arcing Support Structures 28 and their Active Support/Control Structures 36 to the Flexible Sheet assembly 15. The external support for the Support Cord 22 on the Arcing Support Structures is provided by Support Cord Sheave Blocks 23. The Support Cords 22 are connected to the Flexible Sheet assembly 15 using Cord Sheet Mounts 21a.

For each Arcing Support structure 28, one end of a Top Cord 26 is attached to the top surface of the Flexible Sheet assembly 15 via a Cord Sheet Mount 21a. The Top Cord 26 then passes through a Top Cord Sheave Block (Support Structure Mount) 27. The Top Cord e25 then passes through the Top Cord Sheave Block (Reference Plane Mount) en27 and into a Linear-to-Rotational Motion Assembly (117 on FIG. 35. See FIG. 34 for complete diagram) that forms part of the Rotational Force Aggregation Mechanism 29.

For each Arcing Support Structure 28, one end of a Bottom Cord 24 is attached to the bottom surface of the Flexible Sheet assembly 15 via the same Cord Sheet Mount 21a mentioned above. The Bottom Cord 26 then passes through a Bottom Cord Sheave Block 25 and into a Linear-to-Rotational Motion Assembly (117 on FIG. 35. See FIG. 34 for a complete diagram) that forms part of the Rotational Force Aggregation Mechanism 29.

The Rotational Force Aggregation Mechanism 29 attaches to a Generator 30 via the output shaft (not shown) on the Rotational Force Aggregation Mechanism 29.

The Active Support/Control Structure shown in FIG. 36 is composed of a Passive Support Structure 17a (in this case forming the lower section of the Arcing Support Structure 28. Attached to this structure is an enclosure containing a Servo Gearmotor 48 with an attached Winch 122 mechanism. Attached to the Winch 122, is the Support Cord 22 Which then passes through an opening in the Passive Support Structure 17a and through a Bottom Internal Guide Sheave 123. The Support Cord 22 then passes through the Top Internal Guide Sheave 124, back out through an opening in the Passive Support Structure 17a and finally through the External Guide Sheave 125

The Cord Sheet Mount, as shown in FIG. 32 two plates, the Top Mounting Plate 92 and Bottom Mounting Plate 93 that sandwich the Flexible Sheet Axial Beam (40 on FIG. 26). The two plates attach to each other through the Flexible Sheet Axial Beam (40 on FIG. 26).

Attached to the Top Mounting Plate 92 is a Top Ring Holder 97. Attached to this holder are the Support Cord Ring 95 and Top Cord Ring 94. The Support Cord Ring 95 attaches to its respective Support Cord (22 on FIG. 4). The Top Cord Ring 94 attaches to its respective Top Cord (26 on FIG. 4).

Attached to the Bottom Mounting Plate 93 is a Bottom Ring Holder 98 that attaches to its respective Bottom Cord (24 on FIG. 4)

The Top and Bottom Cord Sheave shown in FIG. 33 is composed of a Sheave Block Mounting Plate 99 to which is attached a Swivel 100, enabling a rotational capability. Attached to the Swivel 100 is a Hinge 101 enabling 180 degree pivoting movement in addition to the Swivel 100 capability. The Hinge 101 is attached to a Block Body 102 through which passes a Sheave Shaft 103, holding the Sheave 104 in place.

The Linear-To-Rotational Motion Conversion Mechanism shown in FIG. 34 contains a Recoil Sheave 105 attached to a One-way Clutch Bearing 106. This bearing mounts to the Aggregator Shaft (121 on FIG. 35). Attached to the Recoil Sheave 105 is a Recoil Spring Actuator 107.

The Recoil Sheave 105 and One-way Clutch Bearing 106 are enclosed inside a Recoil Sheave Cover that has a Cord opening 109 and two attached Securing Guides 110.

When the above assembly is brought together with the Recoil Spring Retainer Cup 111, the Recoil Spring Actuator 107 is inserted into the Recoil Spring Actuator Coupling 116. The coupling forms the end of the Recoil Spring 113. The Recoil Spring 113 attaches to the Recoil Spring Inner Retainer 114 that is attached to the Recoil Spring Retainer Cup 111. The Recoil Spring 113 is held inside the Recoil Spring Retainer Cup 111 via a Recoil Spring Retainer Plate 115 attached to the Recoil Spring Retainer Cup 111.

A Shaft Pass-though Hole 112 in the Recoil Spring Retainer Cup 111 enables the Aggregator Shaft (121 on FIG. 35) to pass through without contacting the Recoil Spring Retainer Cup 111.

Attached to the outside of the Recoil Spring Retainer Cup 111 are two Securing Guides 110 that match those attached to the Recoil Sheave Cover 108.

The Rotational Force Aggregation Mechanism as shown in FIG. 35 contains an Aggregator Mount Plate 118 to which attaches two Guide Tubes 119. These guide tubes enable multiple Linear-To-Rotational Motion Conversion Mechanisms (See FIG. 34) 117 to be stacked upon each other secured, and aligned. An Securing Bracket 120 secures the stack to the Aggregator Mount Plate 118.

The multiple Linear-To-Rotational Motion Conversion mechanisms are attached to a common Aggregator Shaft 121, that is attached to a Gearbox 75.

Operation—Alternate Embodiment—FIG. 4

The operation of this embodiment works on the same underlying airflow management and capture principle as described in the alternate embodiment in FIG. 2.

The Support Cords 22 however do not provide any energy capture, and are utilized only to support and control the positioning of the Flexible Sheet assembly 15.

Instead, the oscillation of the Flexible Sheet assembly 15 as described previously in the FIG. 2 embodiment, acts upon the Top Cords 26 and Bottom Cords 24, transmitting the lift generated via these cords.

When the Flexible Sheet assembly 15 circumference lifts at a given position, the Bottom Cords 24 attached to it in the vicinity of that position are pulled upon. The Bottom Cords 24 pulling force is transmitted via the Bottom Cord Sheave Blocks 25 to their respective Linear-To-Rotational Motion Conversion Mechanisms (117 on FIG. 35), where the Bottom Cord 24 is wound around the Recoil Sheave (105 on FIG. 34). The pulling force unwinds the Bottom Cord 24 from the sheave, rotating the Aggregator Shaft (121 in FIG. 35), which then imparts its rotational energy into the Gearbox (75 in FIG. 35) and finally into the Generator 30.

When the Flexible Sheet assembly 15 circumference falls at the given position mentioned above, the Bottom Cords 24 attached to it in the vicinity of the falling position, become slack. This slack is taken up by the action of the Recoil Springs (113 on FIG. 34) in their respective Linear-To-Rotational Motion Conversion Mechanisms (117 on FIG. 35) which wind the slackened Bottom Cord 24 back onto the Recoil Sheave (105 on FIG. 34). This cycle of lift and fall then repeats.

The effect is the same for the Top Cords 26. They operate opposite the cycle described above, so that when a Bottom Cords 24 is being pulled and unwinding from the Linear-To-Rotational Motion Conversion Mechanisms (117 on FIG. 35), its corresponding Top Cord 26 is slackening and rewinding onto the Recoil Sheave (105 on FIG. 34) of its respective Linear-To-Rotational Motion Conversion Mechanism.

The Control System 14 in conjunction with the Wind Sensor Package 13 controls the positioning of the Flexible Sheet assembly 15 via the Active Support/Control Structures 36.

The adjustments to the position of the Flexible Sheet assembly 15 are the same as those described in the embodiment in FIG. 2. However, instead of extending or contracting the Pivot Arms (16) to manipulate the Flexible Sheet Assembly 15, the Support Cords 22 enable the raising and lowering of the points around the circumference of the Flexible Sheet Assembly 15.

In extreme wind situations, the lowering of the Flexible Sheet assembly 15 to the ground or mounting surface can be assisted via the Generator 30 being operated as a motor to winch the Bottom Cords 24.

Detailed Description—Alternate Embodiment—FIG. 5

The perspective view in FIG. 5 shows the addition over the preferred embodiment, of additional structural support. The Vane 7, is attached to two Support Structures 32, one at each end. Attached to these support structures, is an additional Vane 7 at the top of the embodiment. Contained within the top Vane 7, are two Adjustable Pivot Mount assemblies 10 that are connected to the tops of the Pivot assemblies upwind and downwind.

Operation—Alternate Embodiment—FIG. 5

The operation of this embodiment is identical to that described for the preferred embodiment, with the addition of synchronized control of the Adjustable Pivot Mount assemblies 10 by the Control System 14. When the Adjustable Pivot Mount assembly 10 and Pivot Energy Capture/Mount 9 on the bottom Vane 7 are adjusted on their respectively attached gantries, the Pivot Mount assemblies 10 on the top Vane 7 are also adjusted.

Detailed Description—Alternate Embodiment—FIG. 6

The perspective in FIG. 6 shows the addition over the preferred embodiment, of a Vane Rail Support 33. This support is attached to downwind end of the Vane 7 and rides upon the Vane Rail 34.

Operation—Alternate Embodiment—FIG. 6

The operation of this embodiment is identical to that described for the preferred embodiment, with the addition of supplemental support for the Vane Support 8a/8b.

Detailed Description—Alternate Embodiment—FIG. 7

The perspective in FIG. 7 shows an embodiment that is similar to the alternate embodiment in FIG. 4, but that has the following differences:

This embodiment uses the Active Support/Control Structures described previously for FIG. 4 on their own, instead of as a lower portion of the Arcing Support Structures (28 on FIG. 4).

This Active Support/Control Structures connect via Support Cords 22 to a Flexible Sheet 35, which in turn connects to a set of Bottom Cords 24 via the Cord Sheet Mounts 21a.

The Bottom Cords 24, connect to the Rotational Force Aggregation Mechanism 29 in the same manner as that described in the embodiment in FIG. 4 prior.

The Flexible Sheet 35 is explained further by FIGS. 37 and 38. It is constructed of a flexible sheet of material 41, laid flat and then a Flexible Sheet Axial Beam 40 of the material previously described is attached at the sheet material circumference. This axial beam appears similar to that shown in FIG. 26, but as the shape of the flexible sheet is flat, the beam lays flat against it as well. Around the circumference at equally spaced positions are Cord Sheet Mount assemblies 21a.

Operation—Alternate Embodiment—FIG. 7

This embodiment in FIG. 7 operates in the same fashion as that described for the embodiment in FIG. 4, with the following exceptions:

No energy is captured in the falling portion of the Flexible Sheet 35 energy capture cycle.

The Flexible Sheet 35 enables omni-directional operation by utilizing the Active Support/Control Structures 36 to control the shape of the sheet 35 and its orientation into the wind. By increasing the length of a given Support Cord 22, that portion of the sheet where it attaches is allowed to lower itself relative to the other points on the sheet 35 circumference. By reducing the length of a given Support Cord 22, that portion of the sheet where it attaches is raised higher relative to the other points on the sheet 35 circumference.

For this embodiment, an arcing shape is created and oriented so that the plane of the arc is aligned with the direction of the wind. This results in the same airflow management and principles as described previously for FIG. 4.

Detailed Description—Alternate Embodiment—FIG. 8

The perspective in FIG. 8 shows an embodiment designed for use in a flowing water body such as a river. It is identical to the embodiment described in FIG. 5, with the following exceptions:

The structure is protected against corrosion.

The Flexible Sheet 1 is constructed from materials appropriate to extended underwater exposure.

The moveable parts are protected from water intrusion using seals.

The Pivot Energy Capture/Mount 9 is mounted upon the top Vane 7, which is located above the water surface to protect it from water intrusion.

The Vane Support (8a/8b in FIG. 5) is replaced by two Fixed Vane Supports 37 that are aligned to the flow of the water body, and embedded into the bed of the flowing water body, thereby aligning the Vane 7 to the flow.

The Control System 14 is located above the water surface.

Operation—Alternate Embodiment—FIG. 8

The embodiment in FIG. 8 operates in a fashion identical that described in FIG. 5, with the exception that the spacing between the Pivot assemblies 2 and arm lengths of the Pivot arms assemblies (5 in FIG. 11) are optimized for denser fluids such as water.

Detailed Description—Alternate Embodiment—FIG. 9

The perspective in FIG. 9 shows an embodiment that is designed to function in shallow flowing bodies of water. The embodiment utilizes four Passive Support Structures 17b that are embedded into the flowing water body bed in a square or rectangular shape when viewed from above and aligned to the flow of the water body. Attached between to the two upstream Passive Support Structures 17b is a Pivot assembly 2, oriented in a horizontal manner. Instead of the three standard Pivot Arms (5 in FIG. 11) only two Pivot Fixed Arms 126 are utilized. This eliminates the telescoping capability, while retaining the Flexible Sheet Carrier (6 on FIG. 11) and Flexible Sheet Coupler (45 on FIG. 12). Attached between the downstream Passive Support Structures 17b is a second Pivot Assembly 2, oriented in a horizontal manner. Once again, instead of the three standard Pivot Arms (5 in FIG. 11), only two Pivot Fixed Arms 126. And instead of the Flexible Sheet Carrier (6 on FIG. 11) and Flexible Sheet Coupler (45 on FIG. 12) being retained, a Flexible Sheet Rollup Mechanism 38 is instead mounted at the end of the Pivot Fixed Arms 126.

An Underwater-To-Surface drivetrain 39 connects the downstream Pivot assembly to the enclosed set of drivetrain components that are identical to that contained within the Adjustable Pivot Energy Capture and Mount (Shown in FIG. 21). This enclosure is attached to the top of one of the downstream Passive Support Structures 17b, above the water surface.

The top view in FIG. 40 shows the downstream pivot. A Pivot Pole 4 is attached to two Pivot Fixed Arms 126 as described above. Inside one of the Pivot Fixed Arms 126 is attached a Servo Gearmotor 48. To the Servo Gearmotor 48 is attached a Worm Gear 129 that meshes with a gear on the Flexible Sheet Rolling Spindle 127.

Attached next to the Servo Gearmotor 48 is a Spindle Lock 130 that engages the gear on the Flexible Sheet Rolling Spindle 127 to hold it stationary.

Attached to the Flexible Sheet Rolling Spindle 127 are two Rolling Spindle End-Plates 128 that enable the Flexible Sheet (41 in FIG. 10) to stay between the confines of these end-plates.

Additionally, the cross-section view in FIG. 39 shows the downstream pivot. A Pivot Pole 4 is covered with a Pivot Fairing 42. Attached to the Pivot Pole 4 is a Pivot Fixed Arm 126 as described above. Inside the Pivot Fixed Arm 126 is attached a Servo Gearmotor 48. To the Servo Gearmotor 48 is attached a Worm Gear 129 that meshes with a gear on the Flexible Sheet Rolling Spindle 127.

Attached next to the Servo Gearmotor 48 is a Spindle Lock 130 that engages the gear on the Flexible Sheet Rolling Spindle 127 to hold it stationary.

Attached to the Flexible Sheet Rolling Spindle 127 is a Rolling Spindle End-Plate 128.

A Control System 14 is attached to the enclosure housing the above water energy conversion drivetrain.

Operation—Alternate Embodiment—FIG. 9

The embodiment in FIG. 9 operates in a fashion identical that described in FIG. 8, with the following exceptions:

The modified downstream Pivot assembly as described above transfers its pivoting motion into an Underwater-to-Surface Drivetrain 39 within a Passive Support Structure 17b, which then transfers this pivoting motion to the energy capture drivetrain above the water surface. The Control System controls the Servo Gearmotor (48 in FIG. 39) to reel in or out the Flexible Sheet 41 to adjust the available curvature of the Flexible Sheet 41 according to water flow speed.

In low water speed situations, the Flexible sheet 41 can be reeled out to increase curvature and maximize energy capture.

In high water speed situations, the Flexible Sheet 41 can be reeled in to reduce curvature and maximize energy capture.

In situations where maintenance needs to be performed or where energy capture is not desirable, the Flexible Sheet 41 can be reeled in to a state of tension that does not permit the oscillating pivot action.

Conclusion, Ramifications, and Scope

While my above description contains many specifities, these should not be construed as limitations on the scope of the invention, but rather as an exemplification of one preferred embodiment thereof. Many other variations are possible. For example:
1. Scaling of the Flexible sheet to increase energy capture
2. Addition of the device to high-rise building structures
3. Application of the invention embodiments normally intended for wind to water, and vice versa.
4. The extensible arms of the pivots may be substituted for the adjustment of the Pivot mounts, to reduce cost.
5. Other shapes for the flexible sheet that encourage improved lift generation
6. Other appendages to the structure of the mechanism to encourage air flow speed increases past the mechanism.
7. Use of top/bottom energy capture cords on embodiments having only the bottom energy capture cords and vice versa.
8. Use of the water-based embodiments in tidal areas of oceans or in areas of strong current movement.
9. Floating the water-based embodiments upon the surface of the water, suspending their energy capture components below the water surface.
10. Aerodynamic refinements to the structure and flexible sheet to improve performance
11. The use of synthetic or natural materials for the structure of the mechanism including composites.
12. The use of synthetic or natural materials for the flexible sheet, including semi-rigid and rigid materials.
13. The optimization of the layout of the mechanical components such that the disturbances to air flow are minimized.
14. The stacking of multiple vertical or horizontal flexible sheets and related structure to enable a smaller footprint, and to supplement structure
15. To optimize the layout of multiple Oscillating Energy Capture Mechanisms as described, to create a greater result than an individual mechanism, or optimized to avoid detrimental effects.
16. The use of synthetic or natural materials for the structure of the mechanism including composites.
17. The use of the flexible sheet as an public advertising or information medium, including the projection of images onto the surface.

Accordingly, the scope of the invention should be determined not by the embodiments illustrated, but by the appended claims and their legal equivalents.

I claim:
1. An energy capture device, comprising:
(a) a plurality of elongated support members, aligned and joined at spaced locations to the surface of a platform and said elongated support members joined so as to be able to pivot about their own longitudinal axis;
(b) a plurality of elongated members joined to said elongated support members so as to support a flexible sheet of material between said elongated members;

(c) said flexible sheet of material joined to the free ends of said elongated members;
(d) at least one energy conversion device; and
(e) means for controllably coupling said elongated members to said at least one energy conversion device.

2. The energy capture device of claim 1 wherein said platform is of a rotary type.

3. The energy capture device of claim 2 wherein said locations of joining of said elongated support members to said rotary platform are moveable along an axis defined by the alignment of said elongated support members by means of a plurality of gantries.

4. The energy capture device of claim 2 wherein the lengths of said elongated members are extendable and retractable by means of a telescopic adjustment device.

5. The energy capture device of claim 2 further including a spindle mechanism joined to said elongated members whereby said flexible sheet of material may be rolled onto or off of said spindle so as to lengthen or shorten said flexible sheet of material.

6. The energy capture device of claim 2 further including a plurality of said flexible sheet of material joined to said elongated members.

7. The energy capture device of claim 2 further including a plurality of support structures joined to said rotary platform in the same orientation of said elongated support members so as to support a reinforcement structure spanning said elongated support members.

8. The energy capture device of claim 1 wherein said locations of joining of said elongated support members to said platform are moveable along an axis defined by the alignment of said elongated support members by means of a plurality of gantries.

9. The energy capture device of claim 1 wherein the lengths of said elongated members are extendable and retractable by means of a telescopic adjustment device.

10. The energy capture device of claim 1 further including a spindle mechanism joined to said elongated members whereby said flexible sheet of material may be rolled onto or off of said spindle so as to lengthen or shorten said flexible sheet of material.

11. The energy capture device of claim 1 further including a plurality of said flexible sheet of material joined to said elongated members.

12. The energy capture device of claim 1 further including a plurality of support structures joined to said platform in the same orientation of said elongated support members so as to support a reinforcement structure spanning said elongated support members.

13. An energy capture device, comprising:
(a) a plurality of elongated support members spaced evenly about a surface perimeter;
(b) a plurality of elongated members pivotably joined to said elongated support members;
(c) a flexible sheet of material pivotably joined to the free ends of said elongated members so as to be suspended above the plane and within the perimeter of said surface;
(d) at least one energy conversion device; and
(e) means for controllably coupling said elongated members to said at least one energy conversion device.

14. The energy capture device of claim 13 further including means for controllably adjusting the length of said elongated members.

15. The energy capture device of claim 13 wherein:
(a) said elongated members are cords or cables;
(b) said elongated members are joined at one end to the perimeter of said flexible sheet of material;
(c) said elongated members are joined at the opposite ends to said means for controllably coupling the linear motion of said elongated members to said at least one energy conversion device.

16. An energy capture device comprising:
(a) a plurality of elongated support members spaced evenly about a surface perimeter;
(b) a plurality of elongated spanning members joined perpendicularly to said elongated support members at both ends of said elongated spanning members such that said elongated spanning members may pivot about their own longitudinal axis;
(c) a plurality of elongated members joined to said elongated spanning members so as to support a flexible sheet of material between said elongated members;
(d) said flexible sheet of material joined to the free ends of said elongated members;
(e) at least one energy conversion device; and
(f) means for controllably coupling said elongated spanning members to said at least one energy conversion device.

17. The energy capture device of claim 16 further including a spindle mechanism joined to said elongated members and to said flexible sheet whereby said flexible sheet of material may be rolled onto or off of said spindle so as to lengthen or shorten said flexible sheet of material.

* * * * *